(12) United States Patent
Brännström et al.

(10) Patent No.: US 8,687,576 B2
(45) Date of Patent: Apr. 1, 2014

(54) DYNAMIC BANDWIDTH ALLOCATION CONTROL IN A MULTI-ACCESS RADIO COMMUNICATION SYSTEM

(75) Inventors: Nils Brännström, Stockholm (SE); Stephen Craig, Nacka (SE); Raimundas Gaigalas, Solna (SE); Sara Khosravi, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 238 days.

(21) Appl. No.: 13/141,241

(22) PCT Filed: May 27, 2011

(86) PCT No.: PCT/SE2011/050663
§ 371 (c)(1),
(2), (4) Date: Jun. 21, 2011

(87) PCT Pub. No.: WO2012/030271
PCT Pub. Date: Mar. 8, 2012

(65) Prior Publication Data
US 2012/0057478 A1 Mar. 8, 2012

Related U.S. Application Data

(60) Provisional application No. 61/379,768, filed on Sep. 3, 2010.

(51) Int. Cl.
*H04W 72/04* (2009.01)
*H04W 4/00* (2009.01)
(52) U.S. Cl.
USPC ........................................ 370/329; 455/452.2

(58) Field of Classification Search
None
See application file for complete search history.

(56) References Cited

U.S. PATENT DOCUMENTS

| 5,687,167 | A * | 11/1997 | Bertin et al. | 370/254 |
|---|---|---|---|---|
| 6,771,599 | B1 * | 8/2004 | Aoyama et al. | 370/230 |
| 7,200,405 | B2 * | 4/2007 | Rudolf et al. | 455/450 |
| 7,289,468 | B2 * | 10/2007 | Yang et al. | 370/329 |
| 7,773,502 | B2 * | 8/2010 | Vannithamby et al. | 370/229 |

(Continued)

FOREIGN PATENT DOCUMENTS

| EP | 1643690 A1 | 4/2006 |
|---|---|---|
| EP | 1672941 A1 | 6/2006 |

(Continued)

*Primary Examiner* — Gregory Sefcheck
(74) *Attorney, Agent, or Firm* — Coats and Bennett, P.L.L.C.

(57) ABSTRACT

A scheduler for ranking-based scheduling of multiple users on a shared communication channel of a serving base station in a wireless communication system comprises a determiner (42), a priority ranker (44), a user selector (46) and a resource allocator (48). The determiner (42) is configured to determine, for each user of a given traffic class, measured bandwidth share ratios with respect to each of a number of other traffic classes. The priority ranker (44) is configured to determine, for each user, a priority rank based on i) achievable bit rate of the user according to reported channel quality, and ii) a quality of service component representing compliance of the measured bandwidth share ratios to corresponding target bandwidth share ratios. The user selector (46) is configured to select a subset of the users among those users having the highest priority ranks, and the resource allocator (48) is configured to allocate transmission resources of the base station to the selected subset of the users for transmission of user data on the shared communication channel.

29 Claims, 11 Drawing Sheets

(56) References Cited

U.S. PATENT DOCUMENTS

| | | | |
|---|---|---|---|
| 7,843,843 B1* | 11/2010 | Papp et al. | 370/252 |
| 7,853,217 B2* | 12/2010 | Yoshii et al. | 455/67.11 |
| 8,179,853 B2* | 5/2012 | Hu et al. | 370/329 |
| 8,233,426 B2* | 7/2012 | Han et al. | 370/318 |
| 8,265,012 B2* | 9/2012 | Jung et al. | 370/329 |
| 8,265,019 B2* | 9/2012 | Madan et al. | 370/329 |
| 8,385,283 B2* | 2/2013 | Zhang et al. | 370/329 |
| 8,401,036 B2* | 3/2013 | Chandra et al. | 370/469 |
| 2008/0085719 A1 | 4/2008 | Kuchibhotla et al. | |
| 2008/0165836 A1* | 7/2008 | Landau et al. | 375/221 |
| 2011/0182248 A1* | 7/2011 | Fan et al. | 370/329 |

FOREIGN PATENT DOCUMENTS

| | | |
|---|---|---|
| EP | 1758312 A1 | 2/2007 |
| WO | 01/63855 A1 | 8/2001 |
| WO | 2006/106460 A1 | 10/2006 |
| WO | 2010/107348 A1 | 9/2010 |

* cited by examiner

DYNAMIC BANDWIDTH ALLOCATION CONTROL IN A MULTI-ACCESS RADIO COMMUNICATION SYSTEM

This application claims priority to U.S. Patent Application No. 61/379,768, filed on Sep. 3, 2010, which is hereby incorporated by reference herein in its entirety.

TECHNICAL FIELD

The invention generally relates to dynamic bandwidth allocation in a wireless communication system, and more specifically to ranking-based scheduling of multiple users on a shared communication channel of a serving base station in a wireless communication system.

BACKGROUND

Several wireless communication technologies, e.g. WCDMA, LTE or GSM, deploy communication channels shared between multiple mobile users in time. In the present description, the technical ideas will primarily be presented in the context of High Speed Downlink Shared Channel (HS-DSCH) which is the key data channel for High Speed Downlink Packet Access (HSDPA) radio interface in a WCDMA telecommunication system [1][4] but the ideas may also be applied in LTE, GSM or any other wireless communication system where data is transmitted over a shared channel.

In such a system, shown by way of example in FIG. 1, a radio base station 10 transmits data on the shared channel, such as HS-DSCH in WCDMA, to several mobile terminals, also referred to as mobile users, 20-1, . . . , 20-5, where terminals may be mobile phones, computers or other devices with a built-in mobile receiver and/or transmitter. There may be many active connected terminals served by the same base station, where connected means that the terminals have control and data communication channels including the shared data channel established towards this base station. FIG. 1 is a schematic diagram illustrating scheduling of common transmission resources on a shared channel.

In this example, base station resources for the shared channel such as HS-DSCH, are shared between all users in one cell. Consequently, the base station may transmit data on the shared channel such as HS-DSCH to one or a few terminals at a time only. To be able to serve all active terminals in the cell, it transmits data in small intervals or time slots and chooses new terminals for transmission at each time slot. In other words, the data channel is on for users granted access to the shared channel at a particular time slot, and the data channel is off for users that are not granted access at that time slot. The decisions regarding to which users to transmit are made by the scheduler function in the base station. The scheduler function keeps track of available resources and at each time slot grants access to the shared communication channel to selected users according to a certain long-term strategy [4]. The decisions typically take into account the base station resources allocated for the shared channel such as HS-DSCH and the feedback from the terminals about experienced (HS-DSCH) radio link quality, e.g. in the form of Channel Quality Indicator (CQI) [1].

The question addressed here is how to define a short-term user selection strategy at each time slot that would be able to achieve certain predefined performance requirements over a longer time period under the further condition that traffic to different users may have different performance demands or so called Quality of Service (QoS) guarantees. Compliance to desired guarantees of this kind is becoming a crucial feature for downlink mobile broadband performance as the variety and number of supported services is growing all the time.

A difficulty in finding a strategy that achieves QoS demands over a longer time scale stems from the fact that the scheduler usually may not exactly predict the amount of data that may be transmitted, or transmission delays that may be experienced over the time period that it is operating over. The reason is that quality of radio communication channels and hence the amount of data each user is able to receive at each time slot is rapidly varying in time and between different users. Hence, the only way to achieve predefined performance guarantees for each traffic class is by selecting appropriate users for transmission at each time slot, so-called user scheduling.

The service performance guarantee considered here is dynamic bandwidth allocation that follows given bandwidth target shares, i.e. QoS requirements on bandwidth sharing. By this guarantee, each traffic priority class is assigned a bandwidth share ratio relative to the other classes. The whole transmitted data capacity, which may be varying in time, is then dynamically divided between these classes according to these share ratios. The term "bandwidth share" refers here to a transmitted data rate as a share of the total system capacity. Similar QoS requirements may also be stated on the transmission delays.

FIG. 2 is a schematic diagram illustrating an example of QoS bandwidth sharing between different traffic priority classes according to the target share ratios 4:2:1.

An example of the data transmission in a communication system that complies to the QoS requirements on bandwidth sharing considered here is depicted in the example of FIG. 2. In this example, three user priority classes should share the bandwidth according to the target ratios 4:2:1. This means that data traffic to the three user classes shall get shares of 4/7, 2/7 and 1/7 of the total system capacity wherever there are users of all three classes in the system. Otherwise, they should divide the system capacity according to other corresponding bandwidth ratio combinations. In the first time period shown in FIG. 2, there are only users receiving priority 3 class data in the system. They get the whole bandwidth, i.e. the data rate is equal to the total system capacity. Then, in the next period, some users with priority 2 class traffic join the system. The bandwidth is then divided between the data of the two classes by the ratio 2:1, i.e. priority class 2 data gets twice as much bandwidth as priority class 3 data, or, 2/3 and 1/3 of the total system capacity. Then, in the last time period, new users with priority 1 data arrive and hence the bandwidth is shared according to the ratios 4:2:1 or bandwidth shares 4/7, 2/7 and 1/7.

One widely used solution to achieve given bandwidth shares for different traffic priority classes is to apply a scheduling strategy based on user ranking with additional weights for service priority. Some known user ranking-based strategies are e.g. Round Robin, Maximum C/I or Proportional Fair [3] and [4]. In such strategies, each user is assigned the scheduling priority score or rank at every time slot based on e.g. users' instantaneous radio link quality, delay elapsed since the last transmission, amount of data in the buffer [8] or some other information. Users with the highest scheduling score or rank are selected for transmission.

Adding the supplementary service priority weight to a ranking-based strategy guarantees that users transmitting traffic with higher priority are selected for transmission more often while still maintaining the general chosen scheduling strategy within each traffic class. Typically, this weight is chosen to be proportional to the target share ratio for the users' class. For example, given two traffic priority classes with data rate target ratios 2:1, users in the class with the larger target data rate would get a scheduling priority weight two times as high as the weight for users in the other class. Then given that a primary scheduling strategy is chosen such that both user classes would get the same average long-term data rate if no priority weights were applied, users in the class with the larger priority would be chosen for transmission twice as often and hence would achieve twice as high data rate.

To be able to get the same average data rate for both classes, a scheduling strategy has to possess some fairness property, i.e. it has to give equal access to the system to all the users in certain sense. Examples of fair scheduling strategies include Equal Rate strategy which guarantees the same long-term average data rate to all users or Round Robin strategy that assigns all users equal amount of transmission slots. Proportional Fair strategy provides users with data rate proportional to their long-term average radio link quality [3][5] and hence is also a feasible strategy to be deployed with predefined priority weights under the further condition that all user classes would experience the same long-term average radio link quality.

Predefined service priority weights added to the ranking-based strategies with high level of fairness, like Equal Rate or Round Robin, are known to provide required bandwidth shares but they lead to low total amount of data transmitted by the system. The reason is that these strategies ignore the radio link quality and hence may allocate transmission resources to the users that at that time slot experience a temporarily fading dip in signal power. This is a consequence of the fairness-system capacity dilemma in the radio communication systems according to which it is impossible to maximize both of these factors at the same time.

Proportional Fair strategy is known to yield an acceptable compromise between the level of fairness and the total system capacity in case no traffic differentiation is needed [3] and [2]. However, deployed together with predefined service priority weights it yields the required bandwidth share to the different traffic priority classes only under condition that the long-term average radio link quality for each user generating traffic in a certain traffic priority class is not changing over time and that the service priority weights are adjusted to this long-term average quality.

This condition is often violated in the real radio communication networks. There, users come and leave the system randomly and are moving around while connected. The users may traverse coverage dips or experience sudden interference peaks from other cells, which results in that even the long-term average radio link quality may vary widely in time and between different users. As a consequence, Proportional Fair strategy with predefined service priority weights may often fail to achieve the targeted bandwidth shares.

Furthermore, a solution based on a strategy with the same or lower level of fairness as Proportional Fair and predefined service priority weights is typically not robust. That is, a small deviation in average radio link quality between users in different classes may result in a large violation of their bandwidth share ratios. E.g. if a user from a higher priority class has lower average radio link quality than the other users, he/she will be selected for transmission more seldom than needed and will hence get a lower bandwidth share than the target.

These two problems are illustrated by computer simulation results shown in the example of FIG. 3.

FIG. 3 is a schematic diagram illustrating a simulated example for Proportional Fair scheduling policy with constant service priority weights in case of three moving users with different priorities. Priority 1 user moves to a position where average SIR gets 10 dB better and then to a position where average SIR gets 10 dB worse but the bandwidth shares provided by the algorithm fail to adapt to the changes.

There are three users in the system receiving data from three different traffic priority classes with target bandwidth shares 4:2:1. In the beginning, all users have the same average radio link quality and hence Proportional Fair strategy with constant service priority weights renders the required bandwidth shares. However, the user receiving priority class 1 data moves to a position where the average SIR experienced by that user becomes 10 dB higher than that of the other two users and then to a position where his/her average SIR becomes 10 dB lower than that of the other two users. As a consequence, Proportional Fair strategy with constant service priority weights fails to provide required bandwidth shares. As may be seen in the example of FIG. 3, the received data rate of the moving user gets changed while the rates of the other two users remain almost constant thus violating the bandwidth shares.

Another drawback of the strategies with constant service priority weights is that it may take too long time to achieve the target bandwidth share for users with small amount of data in the transmission buffers. This makes it not very suitable for many popular communication services, e.g. web browsing, that generate data in bursts, i.e. where arrivals of many relatively small data chunks are followed by longer periods of waiting times.

A different approach, which does not consider bandwidth share ratios, is taken in reference [10], where a scheduler for a shared wireless channel guarantees QoS requirements for different traffic classes given by explicit minimum target throughputs. However, this puts a requirement on the total system throughput, which needs to be large enough to support the guaranteed throughput bit rates. A token count tracking the user's achieved performance relative to the target minimum throughput is determined for each user, and a weight is determined for each user based on one or more of the token count and a current rate requested by the user. A user having the highest weight is scheduled to be served the next transmission.

Reference [11] relates to a system and method for dynamically controlling weights assigned to consumers competing for a shared resource in which a weighted proportional-share scheduler schedules access of competing flows to a computing service. Reference [12] also relates to weighted proportional share scheduler that maintains fairness in allocating shares of a common resource. The total service capacity of the shared resource in [11, 12] is constant in time but shares required by the users are change by a controller according to the workload of the system in order to achieve the required amount of service for each user. The state of the system is changing due to varying system workload, i.e. flows coming into and leaving the system. These solutions are not useful for wireless communication systems since they do not consider the fact that the total service capacity of a shared resource in the form of a shared radio channel in a wireless system is varying rapidly in time due the radio link quality variations, which introduce new states to the overall system, but rather assume that the service capacity is constant.

Reference [13] relates to a dynamic fair resource allocation scheme for the uplink of a Wideband Code Division Multiple Access (WCDMA) cellular network, taking into account the characteristics of channel fading and inter-cell interference. For non-real-time traffic without stringent delay requirements, the assigned weights can be dynamically adjusted according to channel conditions and, in particular, knowledge of the multipath fading channel gains between the mobile users and their home base station.

SUMMARY

It is a general object of the invention to provide an improved strategy for bandwidth allocation on a shared communication channel of a wireless communication system.

It is a particular object to provide an improved method of ranking-based scheduling of multiple users on a shared communication channel.

It is another particular object to provide a device for ranking-based scheduling of multiple users on a shared communication channel.

It is also an object to provide a scheduler for ranking-based scheduling of multiple users on a shared communication channel, as well as a base station comprising such a scheduler.

In a first aspect, the present technology relates to a method of ranking-based scheduling of multiple users on a shared communication channel of a serving base station in a wireless communication system. The users are divided into a number of traffic classes and each traffic class is associated with a predetermined target bandwidth share and the relation between the target bandwidth shares of different traffic classes are expressed as target bandwidth share ratios. A basic idea is to determine, for each user of a given traffic class, measured bandwidth share ratios with respect to each of a number of other traffic classes, and then determine, for each user, a priority rank based on i) achievable bit rate of the user according to reported channel quality, and ii) a quality of service component representing compliance of the measured bandwidth share ratios to the target bandwidth share ratios. Subsequently, a subset of the users are selected among those users having the highest priority ranks, and transmission resources of the base station are allocated to the selected subset of the users for transmission of user data on the shared communication channel.

In this way, it is possible to consider both the compliance to the QoS requirements and radio quality, which generally also results in improved system capacity.

In a second aspect, there is provided a device for performing such a method.

In a third aspect, the present technology relates to a scheduler for ranking-based scheduling of multiple users on a shared communication channel of a serving base station in a wireless communication system. The users are divided into a number of traffic classes and each traffic class is associated with a predetermined target bandwidth share and the relation between the target bandwidth shares of different traffic classes are expressed as target bandwidth share ratios. According to the present technology, the scheduler comprises a determiner configured to determine, for each user of a given traffic class, measured bandwidth share ratios with respect to each of a number of other traffic classes, and a priority ranker configured to determine, for each user, a priority rank based on i) achievable bit rate of the user according to reported channel quality, and ii) a quality of service component representing compliance of the measured bandwidth share ratios to corresponding target bandwidth share ratios. The scheduler further comprises a user selector configured to select a subset of the users among those users having the highest priority ranks, and a resource allocator configured to allocate transmission resources of the base station to the selected subset of the users for transmission of user data on the shared communication channel.

The scheduler will thus be able to approach the target bandwidth shares over a given period of time, even in environments where the average user radio link quality is varying, which is the situation encountered in most real communication systems. At the same time, since the reported channel quality is taken into account, the scheduler will also work to increase the data rate transmitted to each user and hence improve the overall system capacity.

In a fourth aspect, the present technology provides a base station comprising such a scheduler.

Other advantages offered by the present technology will be appreciated when reading the below detailed description.

BRIEF DESCRIPTION OF DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 4:
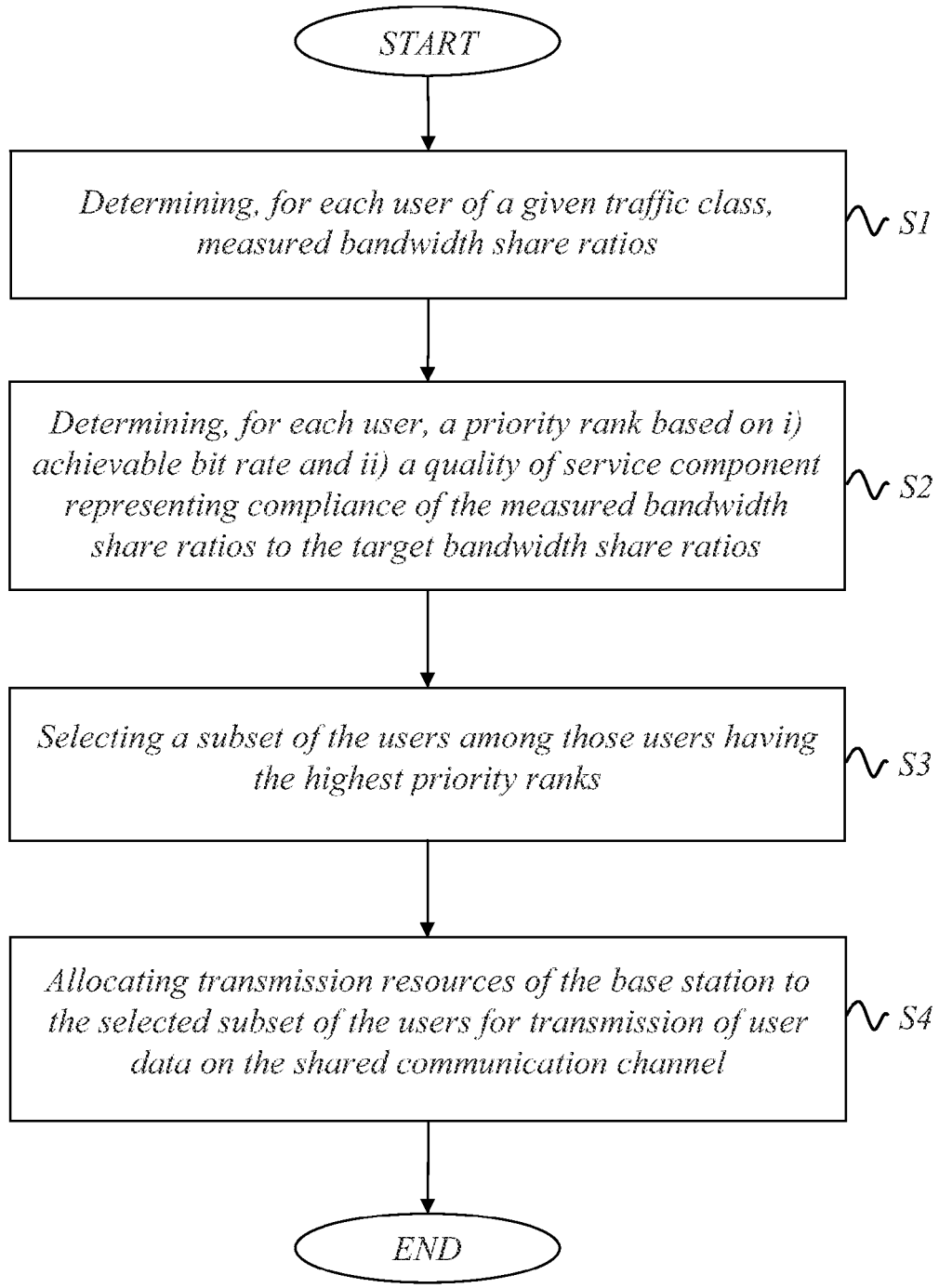
FIG. 4 is a schematic flow diagram illustrating an example of a method of ranking-based scheduling.

In a first aspect, the present technology relates to ranking-based scheduling of multiple users on a shared communication channel of a serving base station in a wireless communication system. The users are divided into a number of traffic classes and each traffic class is associated with a predetermined target bandwidth share and the relation between the target bandwidth shares of different traffic classes are expressed as target bandwidth share ratios. As illustrated in the schematic flow diagram of FIG. 4, a basic idea includes determining, for each user of a given traffic class, measured bandwidth share ratios with respect to each of a number of other traffic classes in step S1. Step S2 includes determining (S2), for each user, a priority rank based on i) achievable bit rate of the user according to reported channel quality, and ii) a quality of service component representing compliance of the measured bandwidth share ratios to the target bandwidth share ratios. Step S3 includes selecting a subset of the users among those users having the highest priority ranks. Step S4 includes allocating transmission resources of the base station to the selected subset of the users for transmission of user data on the shared communication channel.

It will thus be possible to approach the target bandwidth shares over a given period of time, even in environments where the average user radio link quality is varying, which is the situation encountered in most real communication systems. At the same time, since the reported channel quality is taken into account, there is also a driving force in the ranking procedure to increase the data rate transmitted to each user and hence improve the overall system capacity.

This means that it is possible to consider both the compliance to the QoS requirements and radio quality, which generally also results in improved system capacity.

By way of example, the quality of service component includes a correction term for each deviation of the measured bandwidth share ratios from the target bandwidth share ratios.

The users are divided into traffic priority classes, here simply referred to as traffic classes. Actually, it should be understood that the traffic originating from the users is categorized into the traffic classes, while each "user" is considered to generate traffic from one traffic class only.

Figure 5:
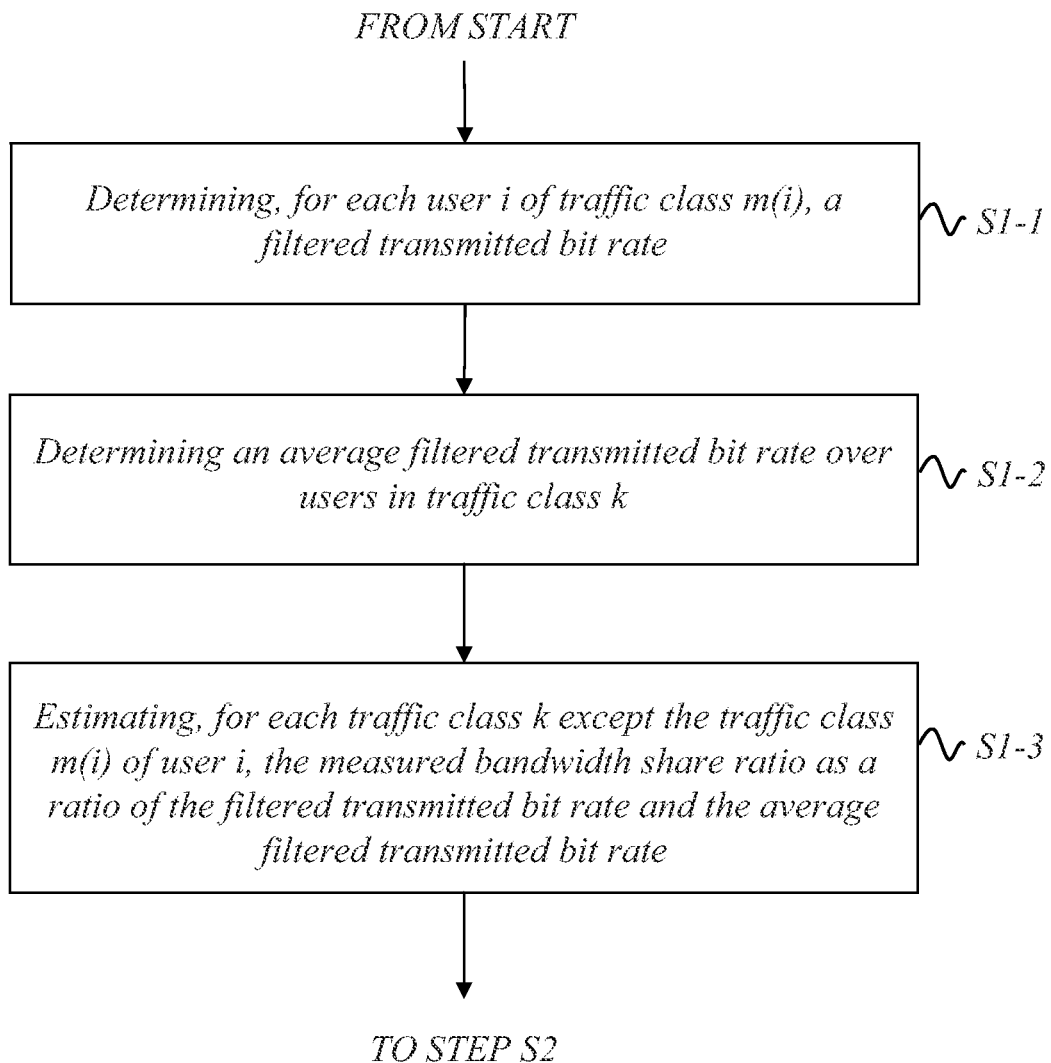
FIG. 5 is a schematic flow diagram illustrating an example of how measured bandwidth ratios may be determined.

FIG. 5 is a schematic flow diagram illustrating an example of how measured bandwidth ratios may be determined. In this particular example, the step of determining, for each user of a given traffic class, measured bandwidth share ratios with respect to each of a number of other traffic classes comprises the following steps. Step S1-1 includes determining, for each user i of traffic class m(i), a filtered transmitted bit rate $R_i(n)$ over a number n of time slots. Step S1-2 includes determining an average filtered transmitted bit rate $\overline{R}^{(k)}(n)$ over users in traffic class k. Step S1-3 includes estimating, for each traffic class k except the traffic class m(i) of user i, the measured bandwidth share ratio as a ratio of the filtered transmitted bit rate and the average filtered transmitted bit rate expressed as:

$$\frac{R_i(n)}{\overline{R}^{(k)}(n)}.$$

The target bandwidth shares of the traffic classes may be expressed as $\omega^{(1)}, \omega^{(2)} \ldots, \omega^{(K)}$, assuming there are a number K of traffic classes, and $$\frac{\omega^{(m(i))}}{\omega^{(k)}}$$

is the target bandwidth share ratio of traffic class m(i) relative to traffic class k. In a particular example, the correction term, for each user i of traffic class m(i), may include, for each traffic class k except the traffic class m(i) of user i, a difference defined as:

$$\frac{R_i(n)}{\overline{R}^{(k)}(n)} - \frac{\omega^{(m(i))}}{\omega^{(k)}}.$$

In this way, each deviation of the measured bandwidth share ratios from the target bandwidth share ratios can be corrected for, at least partly.

In a particular example, valid to any of the embodiments, $\overline{R}^{(k)}(n)$ is the average of filtered transmitted rate $R_i(n)$ over the users in traffic class k that has received transmitted rate larger than some given non-zero threshold $R_{imin} \geq 0$. This will be explained in more detail later on.

A particular example of a suitable rank function for determining a priority rank for each user i can be defined as:

$$\text{rank}_i = r_i(n)\left(\alpha_i V_i'(R_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V_i'(R_i(n))$ is the derivative of a basic utility function $V_i(R_i(n))$ for a radio link quality aware scheduling policy, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, \text{ if } \overline{R}^{(k)}(n) > 0, \\ 0, \text{ if } \overline{R}^{(k)}(n) \leq 0. \end{cases}$$

Another example of a suitable rank function for determining a priority rank for each user i can be defined as:

$$\text{rank}_i = r_i(n)\left(\alpha_i V_i'(S_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V_i'(S_i(n))$ is the derivative of a basic utility function $V_i(S_i(n))$ for a radio link quality aware scheduling policy, where $S_i(n)$ is a filtered transmitted rate estimated with a different filter operating at different time scale than the filter used for estimating the filtered transmitted rate $R_i(n)$, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

The configurable constants $\alpha_i$ and $\beta_i$ control the impact of the respective terms in the rank function, as will be illustrated with reference to a number of examples later on. By way of example, the constants $\alpha_i$ and $\beta_i$ may all be non-zero. Alternatively, the constants $\alpha_i$ may be zero.

Preferably, the achievable bit rate $r_i(n)$ of user i is defined as the bit rate achievable according to reported channel quality if the user is scheduled in time slot n. For example, the achievable bit rate $r_i(n)$ may be defined as the transport block size that the user is able to receive at time slot n according to the reported channel quality.

The ranking-based scheduling of transmission resources is typically performed for each of a number of time slots, and the step of allocating transmission resources includes the step of granting, for each time slot, access to the shared communication channel to the selected subset of the users to effectuate dynamic bandwidth allocation.

Figure 6:
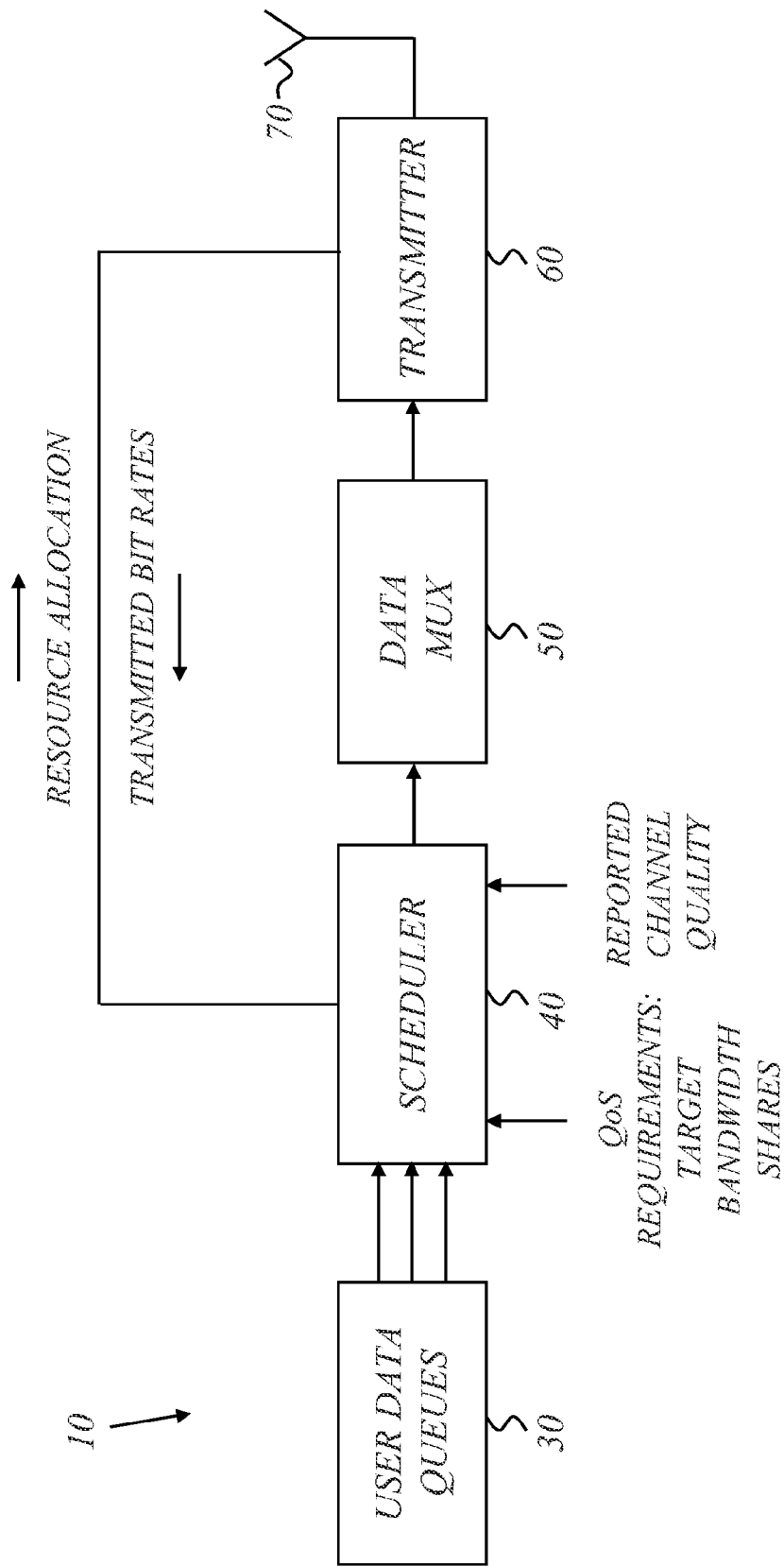
FIG. 6 is a schematic block diagram illustrating an example of a base station including a scheduler.

FIG. 6 is a schematic block diagram illustrating an example of a base station including a scheduler. Basically, the base station 10 comprises a number of user data queues 30, a scheduler 40, a data multiplexer (MUX) 50, a transmitter and one or more antennas 70. The scheduler 40 is configured for receiving input information such as reported channel quality, QoS requirements in the form of target bandwidth shares, and optionally also information on transmitted bit rates obtained from the transmitter 60, and for taking scheduling decisions based on the input information. At each scheduling decision, a selected subset of users are selected and granted access to the shared channel. This means that user data from the user data queues 30 for the selected subset of users is sent to the data multiplexer 50 and prepared for transmission by the transmitter 60.

The scheduler 60 communicates information to the transmitter about the resource allocation representing the transmission resources such as channelization codes, modulation settings and/or transmission power that are allocated to the selected subset of the users for transmission of user data on the shared communication channel. The transmitter 60 is configured to transmit the user data obtained from the data multiplexer 50 to the mobile users (not shown in FIG. 6) via the antenna(s) 70 using the allocated transmission resources.

Figure 7:
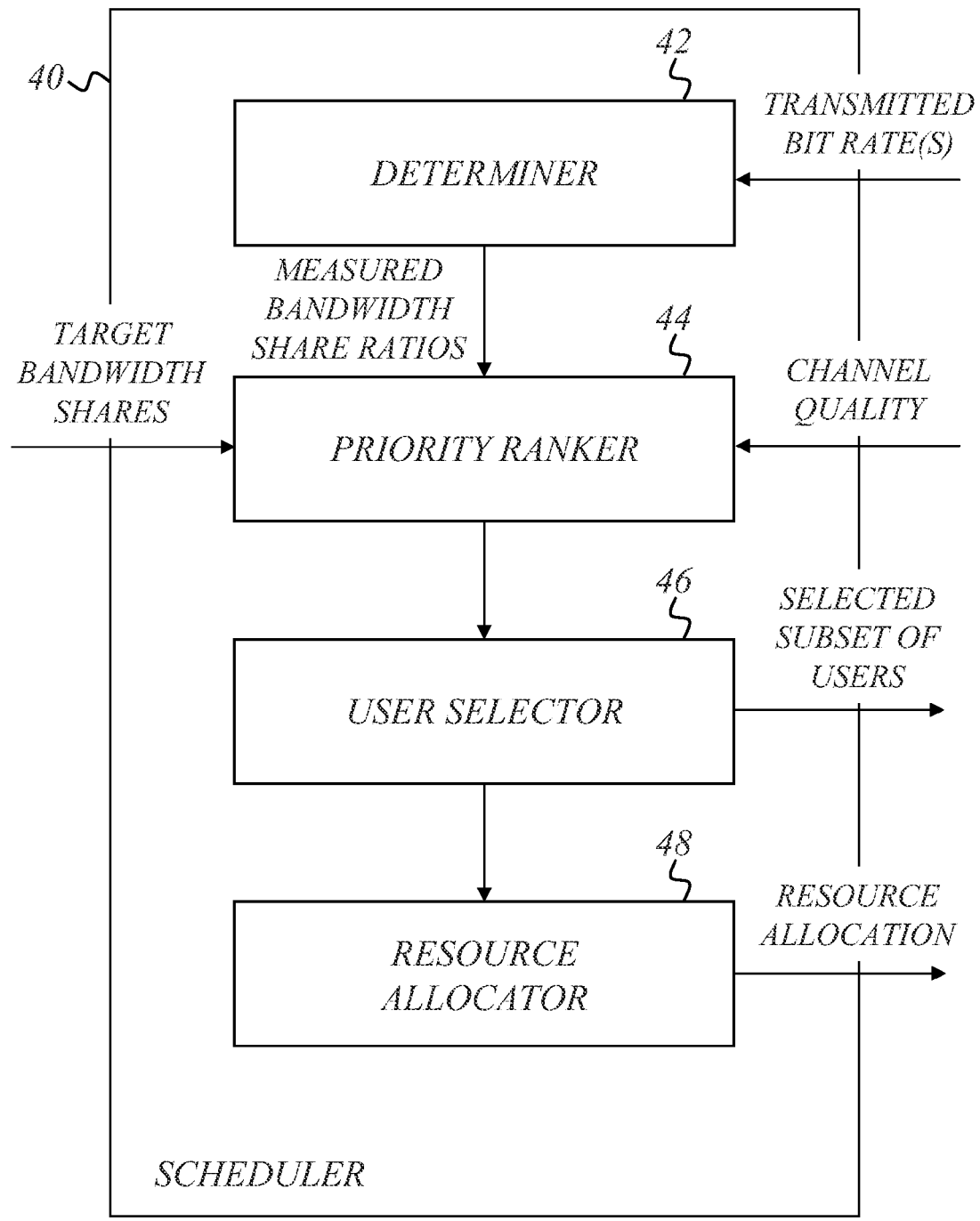
FIG. 7 is a schematic block diagram illustrating an example of a scheduler.

FIG. 7 is a schematic block diagram illustrating an example of a scheduler or device for ranking-based scheduling of multiple users on a shared communication channel of a serving base station in a wireless communication system. The scheduler 40 basically comprises a determiner 42, a priority ranker 44, a user selector 46 and a resource allocator 48.

The determiner 42 is configured to determine, for each user of a given traffic class, measured bandwidth share ratios with respect to each of a number of other traffic classes. The priority ranker 44 is configured to determine, for each user, a priority rank based on i) achievable bit rate of the user according to reported channel quality, and ii) a quality of service component representing compliance of the measured bandwidth share ratios to corresponding target bandwidth share ratios. As previously mentioned, users are divided into a number of traffic classes and each traffic class is associated with a predetermined target bandwidth share and the relation between the target bandwidth shares of different traffic classes are expressed as target bandwidth share ratios.

The user selector 46 is configured to select a subset of the users among those users having the highest priority ranks, and the resource allocator 48 is configured to allocate transmission resources of the base station to the selected subset of the users for transmission of user data on the shared communication channel. The user selector 46 and the resource allocator 48 may be integrated.

Preferably, the priority ranker 44 is configured to determine, for each user, a priority rank based on i) achievable bit rate of the user according to reported channel quality and ii) a quality of service component that includes a correction term for each deviation of the measured bandwidth share ratios from the target bandwidth share ratios.

By way of example, the determiner 42 is configured to determine, for each user i of traffic class m(i), a filtered transmitted bit rate $R_i(n)$ over a number n of time slots, determine an average filtered transmitted bit rate $\overline{R}^{(k)}(n)$ over users in traffic class k, and estimate, for each traffic class k except the traffic class m(i) of user i, the measured bandwidth share ratio as a ratio of the filtered transmitted bit rate and the average filtered transmitted bit rate expressed as:

$$\frac{R_i(n)}{\overline{R}^{(k)}(n)}.$$

For example, the priority ranker 44 may then be configured to determine, for each user, a priority rank based at least partly on achievable bit rate of the user and a quality of service component, which includes a correction term that, for each user i of traffic class m(i), includes, for each traffic class k except the traffic class m(i) of user i, a difference defined as:

$$\frac{R_i(n)}{\overline{R}^{(k)}(n)} - \frac{\omega^{(m(i))}}{\omega^{(k)}},$$

where $$\frac{\omega^{(m(i))}}{\omega^{(k)}}$$

is the target bandwidth share ratio of traffic class m(i) relative to traffic class k and the target bandwidth shares of the traffic classes are expressed as $\omega^{(1)}, \omega^{(2)}, \ldots, \omega^{(K)}$, assuming there are a number K of traffic classes.

In an optional embodiment, the determiner 42 is configured to determine the average filtered transmitted bit rate $\overline{R}^{(k)}(n)$ as an average of filtered transmitted rate $R_i(n)$ over the users in traffic class k that has received transmitted rate larger than some given non-zero threshold $R_{imin} \geq 0$.

In a particular example, the priority ranker 44 is configured to determine, for each user, a priority rank according to the following rank function:

$$\text{rank}_i = r_i(n)\left(\alpha_i V_i'(R_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V_i'(R_i(n))$ is the derivative of a basic utility function $V_i(R_i(n))$ for a radio link quality aware scheduling policy, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

In another alternative example, the priority ranker 44 is configured to determine, for each user, a priority rank according to the following rank function:

$$\text{rank}_i = r_i(n)\left(\alpha_i V_i'(S_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V_i'(S_i(n))$ is the derivative of a basic utility function $V_i(S_i(n))$ for a radio link quality aware scheduling policy, where $S_i(n)$ is a filtered transmitted rate estimated with a different filter operating at different time scale than the filter used for estimating the filtered transmitted rate $R_i(n)$, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

The priority ranker 44 may for example be configured to operate based on constants $\alpha_i$ and $\beta_i$ that are non-zero. Alternatively, the priority ranker 44 may be configured to operate based on constants $\alpha_i$ that are zero.

Normally, the scheduler 40 is configured to perform the ranking-based scheduling of transmission resources on a time-slot basis to effectuate the dynamic bandwidth allocation. The resource allocator 48 is then typically configured to grant, for each time slot, access to the shared communication channel to the selected subset of the users.

In some sense, the present technology concerns a ranking-based method for scheduling of multiple users where service priority weights for at least a subset of said users are set dynamically at each time slot instead of being predefined constants as in the prior art. Said service priority weights are adjusted based on continuous feedback from at least the measured bandwidth share ratios and radio link quality variations, of another subset of said multiple users.

The scheduling method presented herein has at least some of the following advantages:

The described scheduling method allows us to achieve required bandwidth shares for different traffic priority classes over a given time period by dynamically adjusting the present measured bandwidth shares which means that it dynamically adapts to the present average user radio link quality. Hence, it will be able to provide the target bandwidth shares even in environments where the average user radio link quality is varying, which is the situation encountered in most real networks.

At the same time, since the disclosed scheduling method takes radio link quality into account, the data rate transmitted to each user and hence overall system capacity according to this method will typically be higher than by deploying any other totally fair ranking-based strategy with constant service priority weights which has no radio link quality knowledge, such as Equal Rate.

Another advantage of the scheduling method is that it is possible to smoothly steer the level of compliance to the bandwidth share requirements. Given that some small deviations are acceptable in the bandwidth shares, it is possible to lower the level of compliance to the one corresponding to a given error in the bandwidth shares thus increasing the system capacity. This gives a possibility to find a desired balance between compliance to the bandwidth share requirements and the system capacity.

In a particular example, the described scheduling method also provides a possibility to steer the time it takes to reach the bandwidth share targets. Hence, it is possible to choose an optimal time scale for the algorithm depending on the dominating traffic type in the network. This allows us to achieve QoS requirements even for bursty traffic with small data bursts and long periods of waiting times.

In the following, various non-limiting examples of embodiments of the present technology will be described below. However, for better understanding of the scheduling method of the present technology, this section starts with an overview of an example of a basic framework for deriving a scheduling method which takes into account radio link quality variations and maximizes the total system capacity with some additional constraints described in [6][7][2]. Those skilled in the art will find that this framework may provide a very concise and compact description that may be useful in explaining the scheduling method of the present technology.

Let n=1, 2, . . . be the transmission time slots, M the number of users served by one base station, $r_i(n)$ be the achievable bit rate of user i if scheduled in time slot n and $R_i(n)$ exponentially filtered transmitted bit rate for user i after n time slots:

$$R_i(n+1) = (1-\rho)R_i(n) + \rho I_i(n)r_i(n), \quad (1)$$

where $$I_i(n) = \begin{cases} 1, & \text{if user } i \text{ is scheduled in slot } n, \\ 0, & \text{otherwise,} \end{cases}$$

and $\rho$ is the filter constant. Here the filter is initialized to some non-zero value:

$$R_i(0) = R_{i0}, \text{ for some } R_{i0} > 0, \quad (2)$$

so that $R_i(n)$ is always greater than zero. In the context of HSDPA, $r_i(n)$ would be the transport block size that the UE is able to receive at time slot n according to the reported CQI.

According to [6] [2] and [9], an optimal scheduling strategy that maximizes the total system capacity and takes into account radio link quality variations should solve the following optimization problem:

$$\max \sum_{i=1}^{M} U_i(R_i) \qquad (3)$$

$$\text{subject to } \sum_{i=1}^{M} R_i < C$$

$$\text{over } R_i \geq 0, 1 \leq i \leq M$$

where C is the channel capacity and $U_i(R_i)$ is the utility function of user i.

It has been proved in [6][2][9] that one scheduling strategy that solves the optimization problem (3) is the one that in the time slot n picks for transmission users with the highest priority ranks where ranks are given by $$\text{rank}_i = r_i(n) U_i'(R_i(n)), i=1, \ldots, M. \qquad (4)$$

Ties when two or more users have the same rank have to be handled separately depending on the utility function $U_i(R_i)$. Typically, ties are solved by choosing users for transmission randomly.

Many known radio link quality-aware scheduling policies can be fitted into this framework as they solve the optimization problem (3) for some user utility function $U_i(R)$ by the rank computation (4). E.g. utility function $U(R)=\text{const} \cdot R$ will result in $U'(R)=\text{const}$ and ranks $r_1(n), \ldots, r_M(n)$, which is Maximum C/I scheduler. The function $U(R)=\text{const} \log R$ will render $U'(R)=\text{const}/R$ and ranks $r_1(n)/R_1(n), \ldots, r_M(n)/R_M(n)$ or Proportional Fair scheduler. Moreover, given some appropriate utility function $U_i(R)$, it is easy to derive user priority ranks that yield a scheduling policy that solves the optimization problem (3) by computing the derivative $U_i'(R)$.

QoS Requirements for Bandwidth Sharing

The present scheduling method guarantees QoS bandwidth shares to different data traffic classes over a given time scale according to the following criteria. Assume that each user in a telecommunication system receives only data from one traffic priority class, that there are K traffic priority classes in the network and that $\omega^{(1)}>0, \omega^{(2)}>0, \ldots, \omega^{(K)}>0$ are the target bandwidth shares. Such communication system is said to comply to the QoS requirements on bandwidth shares if for any priority class j the average filtered transmitted rate $\overline{R}^{(j)}$ over all users in that class after certain time satisfies the ratios $$\frac{\overline{R}^{(j)}}{\overline{R}^{(k)}} = \frac{\omega^{(j)}}{\omega^{(k)}}, \text{ for all } j \neq k.$$

Here the transmitted rate $\overline{R}^{(k)}$ is an average in some chosen meaning, e.g. arithmetic mean, median or some other type of average measure. Here both a number divided by zero and zero divided by zero are understood as infinity.

As noted above, similar QoS requirements may also be stated on transmission delays instead of transmitted data rate.

An Example of a Radio Link Quality-Aware Scheduler with QoS Bandwidth Sharing

Examples of User Utility Function for Bandwidth Share Control

A radio link quality-aware scheduling method which guarantees QoS bandwidth shares to different data traffic classes over a given time scale according to the definition above and which is the main object of the present invention may be found by deploying the solution (4) to the optimization problem (3) with a new utility function defined as:

$$U_i(R) = \alpha_i V_i(R) - \beta_i \sum_{\substack{k=1 \\ k \neq m(i)}}^{K} \left( \frac{R}{\overline{R}^{(k)}} - \frac{\omega^{(m(i))}}{\omega^{(k)}} \right)^2 \cdot 1_{\{\overline{R}^{(k)}>0\}}, \qquad (5)$$

where $V_i(R)$ is some other known utility function for a radio link quality-aware scheduling policy, $\overline{R}^{(k)}$ is the filtered transmitted rate averaged over the users in priority class k that have received transmitted rate larger than the given threshold $R_{imin}$, m(i) is the priority class for user i, parameters $\alpha_i \geq 0$ and $\beta_i \geq 0$ are some constants steering the impact of the corresponding terms and $$1_{\{\overline{R}^{(k)}>0\}}$$

is the indicator function:

$$1_{\{\overline{R}^{(k)}>0\}}(\overline{R}^{(k)}) = \begin{cases} 1, & \text{if } \overline{R}^{(k)} > 0, \\ 0, & \text{if } \overline{R}^{(k)} \leq 0. \end{cases}$$

Hence, a penalty term, also referred to as a correction term, is imposed to some other known utility function $V_i(R)$ for each deviation from the bandwidth shares.

In the preferred embodiment, the filtered transmitted rate $R_i(n)$ is defined as exponentially filtered transmitted rate $I_i(n)$ $r_i(n)$ as in formula (1) above. In other embodiments, some other filter may be applied to the transmitted rate $I_i(n)r_i(n)$.

Example of Definition of the Average Filtered Transmitted Rate $\overline{R}^{(k)}(n)$ In the preferred embodiment of the invention, $\overline{R}^{(k)}(n)$ is the arithmetic mean of filtered transmitted rate $R_i(n)$ over the users in the priority class k that has received transmitted rate larger than some given threshold $R_{imin} \geq 0$. Let $R_i(n)$ be the filtered transmitted rate for the user i in the priority class k and $H^{(k)}(n)$ be the number of users in the priority class k that have received transmitted rate larger than the threshold $R_{imin}$:

$$H^{(k)}(n) = \sum_{i=1}^{M^{(k)}(n)} 1_{\{R_i(n)>R_{imin}\}}(R_i(n)),$$

where $M^{(k)}(n)$ is the number of active users in the priority class k and $$1_{\{R_i(n)>R_{imin}\}}(R_i(n)) = \begin{cases} 1, & \text{if } R_i(n) > R_{imin}, \\ 0, & \text{if } R_i(n) \leq R_{imin}. \end{cases}$$

Then the average filtered transmitted rate $\overline{R}^{(k)}(n)$ is defined by $$\overline{R}^{(k)}(n) = \frac{1}{H^{(k)}(n)} \sum_{i=1}^{M^{(k)}(n)} R_i(n) \cdot 1_{\{R_i(n)>R_{imin}\}}(R_i(n)).$$

In particular, if the threshold $R_{imin}$ is set to zero, then $$\overline{R}^{(k)}(n) = \frac{1}{M^{(k)}(n)} \sum_{i=1}^{M^{(k)}(n)} R_i(n) \qquad 5$$

is the arithmetic mean of the filtered transmitted rate $R_i(n)$ over the users in the priority class k.

In other embodiments, $\overline{R}^{(k)}(n)$ may be a median or some other type of average measure.

Furthermore, in the preferred embodiment, the initial value $R_i(0)$ of the filtered transmitted rate $R_i(n)$ is set to some non-zero real number as in formula (2), so that $R_i(n)$ is always greater than zero. Then, if the threshold $R_{imin}$ is set to zero, then the average filtered transmitted rate $\overline{R}^{(k)}(n)$ is always greater than zero and the measured bandwidth share ratios $R_i/\overline{R}^{(k)}$ in formula (5) are always well-defined. In case the threshold $R_{imin}$ is set to some non-zero positive value, there might be a class where no user has a received transmitted rate larger than the threshold $R_{imin}$. In that case both $H^{(k)}(n)$ and $\overline{R}^{(k)}(n)$ will be equal to zero for that class but this class will be skipped in the correction term in formula (5) due to that the indicator function $$1_{\{\overline{R}^{(k)}>0\}}$$

will attain the value zero. Thus, the utility function $U_i(R)$ is well-defined.

Definition of the Primary Utility Function $V_i(R)$

The primary utility function $V_i(R)$ may for example be given by $$V_i(R) = W^{(m(i))} \int_{-\infty}^{R} \frac{dx}{x^\lambda} = \begin{cases} \frac{R^{1-\lambda}}{1-\lambda}, & \text{for } \lambda \geq 0, \lambda \neq 1, \\ \log R, & \text{for } \lambda = 1, \end{cases}$$

here m(i) is the priority class for user i and $\lambda \geq 0$ a so called "fairness" parameter. For $\lambda=1$ this is the utility function for Proportional Fair policy with constant service priority weights $W^{(m(i))}$ and for $\lambda=0$ this is the utility function for Maximum C/I scheduler with constant service priority weights $W^{(m(i))}$.

Examples of User Priority Ranks for Transmission Scheduling

To get an expression for user priority ranks, we need to compute the derivative $U_i'(R)$:

$$U_i'(R) = \alpha_i V_i'(R) - 2\beta_i \sum_{\substack{k=1 \\ k \neq m(i)}}^{K} \frac{1}{\overline{R}^{(k)}} \left( \frac{R}{\overline{R}^{(k)}} - \frac{\omega^{(m(i))}}{\omega^{(k)}} \right) \cdot 1_{\{\overline{R}^{(k)}>0\}}.$$

Inserted into formula (4), this implies that an example of a radio link quality-aware scheduling method which guarantees QoS bandwidth shares to different data traffic classes over a given time scale is the one that in time slot n schedules the users with the highest priority rank where ranks are given by $$\text{rank}_i = \qquad (6)$$

$$r_i(n) \left( \alpha_i V_i'(R_i(n)) - 2\beta_i \sum_{\substack{k=1 \\ k \neq m(i)}}^{K} \frac{1}{\overline{R}^{(k)}(n)} \left( \frac{R_i(n)}{\overline{R}^{(k)}(n)} - \frac{\omega^{(m(i))}}{\omega^{(k)}} \right) \cdot 1_{\{\overline{R}^{(k)}(n)>0\}} \right),$$

where $r_i(n)$ is the achievable bit rate of user i if scheduled in time slot n and other quantities are defined above.

Figure 8:
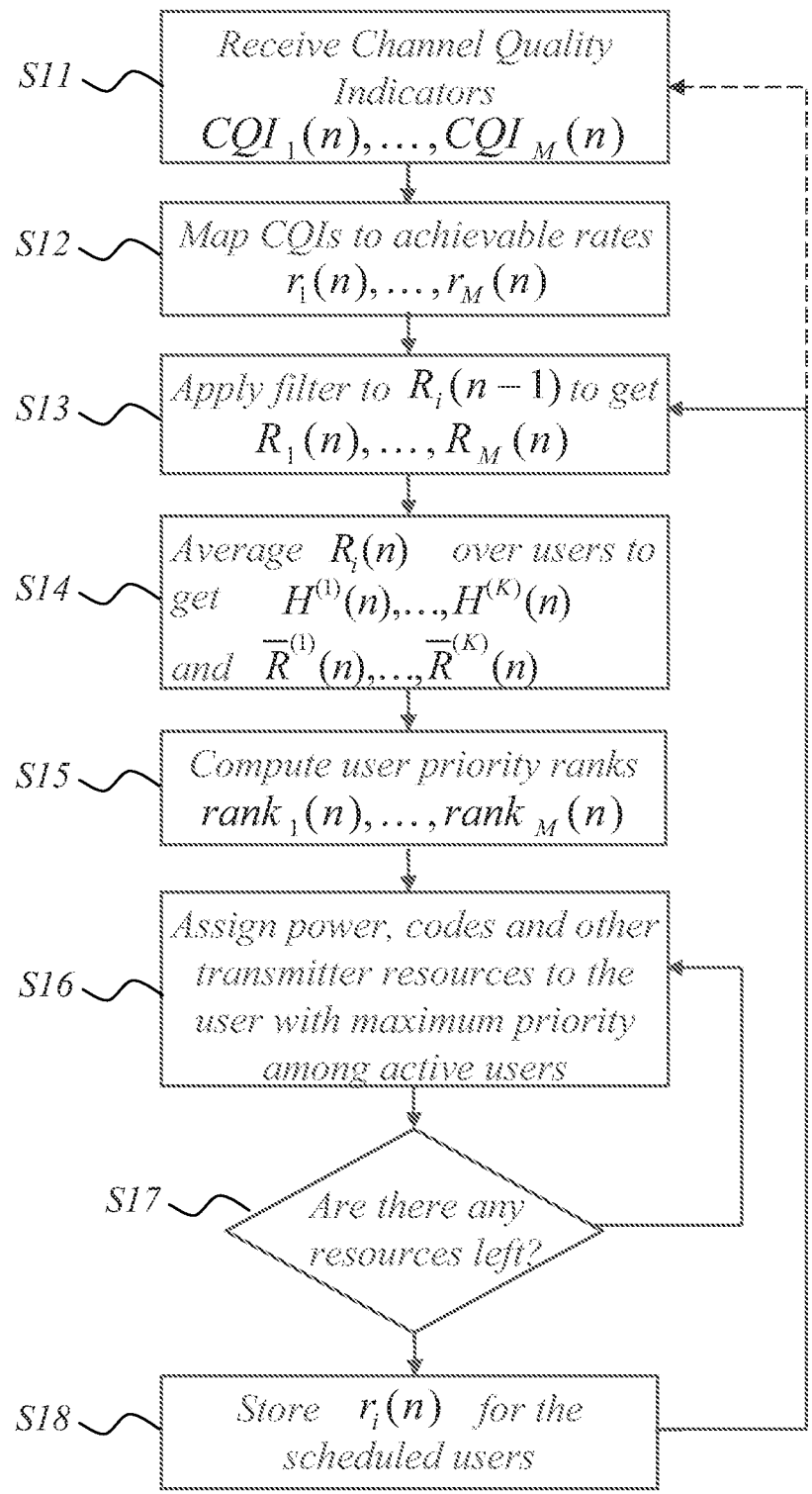
FIG. 8 is a schematic diagram illustrating a flow chart of an example of a scheduling procedure that involves computing ranks according to a specific embodiment.

FIG. 8 is a schematic diagram illustrating a flow chart of an example of a scheduling procedure that involves computing the ranks above. In step S11, channel quality indicators $CQI_1(n), \ldots CQI_M(n)$ are received. In step S12, the channel quality indicators CQIs are mapped to achievable rates $r_1(n), \ldots, r_M(n)$. In step S13, a filter is applied to $R_i(n-1)$ to get the filtered transmitted rates $R_1(n), \ldots, R_M(n)$. In step S14, $R_i(n)$ is averaged, for each priority class k, over users in that class to get $H^{(1)}(n), \ldots, H^{(K)}(n)$ and $\overline{R}^{(1)}(n), \ldots, \overline{R}^{(K)}(n)$. In step S15, user priority ranks $\text{rank}_1(n), \ldots, \text{rank}_M(n)$ are computed. In step S16, power, codes and other transmitter resources are assigned to the users with maximum priority among the active users. In step S17, it is checked whether there are any resources left. If yes, these resources are allocated as in step S16. If no, the achievable rates $r_i(n)$ are stored for the scheduled users in step S18, and the procedure may continue with step S13 or step S11, using the stored achievable rates $r_i(n)$ in step S13 in the next iteration of the filtering procedure.

Handling Ties in User Priority Ranks

In the preferred embodiment, ties between two or more users that have the same rank may be solved by scheduling these users according to their data traffic priority. Further ties between users that have the same ranks and the same data traffic priority may be solved by choosing users for transmission randomly.

An Example of the Adaptive Strategy Improving Proportional Fair Strategy with Constant Service Priority Weights In this particular example, assume that there are three traffic priority classes in the network with desired bandwidth shares $\omega^{(1)}=4$, $\omega^{(2)}=2$, $\omega^{(3)}=1$ and choose the primary user utility function $V_i(R)$ to be the one for Proportional Fair policy with constant service priority weights:

$$V_i(R) = W^{(m(i))} \log R.$$

Then ranks in formula (6) defining the scheduling method become $$\text{rank}_i = \begin{cases} A_i^{(1)}(n), & \text{if user } i \text{ receives priority 1 data,} \\ A_i^{(2)}(n), & \text{if user } i \text{ receives priority 2 data,} \\ A_i^{(3)}(n), & \text{if user } i \text{ receives priority 3 data,} \end{cases}$$

where $$A_i^{(1)} = r_i(n) \left( \frac{\alpha_i W^{(1)}}{R_i(n)} - 2\beta_i \frac{1_{\{\overline{R}^{(2)}(n)>0\}}}{\overline{R}^{(2)}(n)} \left( \frac{R_i(n)}{\overline{R}^{(2)}(n)} - 2 \right) - 2\beta_i \frac{1_{\{\overline{R}^{(3)}(n)>0\}}}{\overline{R}^{(3)}(n)} \left( \frac{R_i(n)}{\overline{R}^{(3)}(n)} - 4 \right) \right),$$

$$A_i^{(2)} = r_i(n) \left( \frac{\alpha_i W^{(2)}}{R_i(n)} - 2\beta_i \frac{1_{\{\overline{R}^{(1)}(n)>0\}}}{\overline{R}^{(1)}(n)} \left( \frac{R_i(n)}{\overline{R}^{(1)}(n)} - \frac{1}{2} \right) - 2\beta_i \frac{1_{\{\overline{R}^{(3)}(n)>0\}}}{\overline{R}^{(3)}(n)} \left( \frac{R_i(n)}{\overline{R}^{(3)}(n)} - 2 \right) \right),$$

$$A_i^{(3)} = r_i(n) \left( \frac{\alpha_i W^{(3)}}{R_i(n)} - 2\beta_i \frac{1_{\{\overline{R}^{(1)}(n)>0\}}}{\overline{R}^{(1)}(n)} \left( \frac{R_i(n)}{\overline{R}^{(1)}(n)} - \frac{1}{4} \right) -$$

$$2\beta_i \frac{1_{\{\overline{R}^{(2)}(n)>0\}}}{\overline{R}^{(2)}(n)} \left(\frac{R_i(n)}{\overline{R}^{(2)}(n)} - \frac{1}{2}\right)\bigg).$$

The first term in each of these expressions is exactly the rank for Proportional Fair policy with constant service priority weights ($W^{(1)}, W^{(2)}, W^{(3)}$). The remaining terms constitute the dynamic rank correction based on the measured bandwidth ratios $\overline{R}_i(n)/\overline{R}^{(k)}(n)$.

Controlling Level of Compliance to QoS Requirements by Parameters $\alpha_i$ and $\beta_i$ Parameters $\alpha_i \geq 0$ and $\beta_i \geq 0$ control the impact of the correction term on the scheduling priority ranks and hence desired level of compliance to QoS requirements. Setting $\alpha_i$ and $\beta_i$ so that the second (i.e. dynamic correction) term in expression (6) for the ranks is dominating, will result in a scheduling method with higher compliance to the QoS requirements on the bandwidth sharing. Setting $\alpha_i$ and $\beta_i$ so that the first term in expression (6) for the ranks is dominating, will yield a radio link quality-aware scheduling policy close to that corresponding to the primary user utility function $V_i(R)$.

Two extreme cases are obtained by setting $\alpha_i=0$ or $\beta_i=0$. Setting all $\alpha_i=0$ will result in a scheduling method which yields highest possible compliance to the QoS requirements on the bandwidth sharing and neglects the utility function $V_i(R)$. Setting all $\beta_i=0$ will yield a radio link quality-aware scheduling policy corresponding to the primary user utility function $V_i(R)$ that ignores feedback on the measured bandwidth shares. Consequently, the present technology assumes that at least some of the $\beta_i$ values are non-zero.

In the preferred embodiment, the utility function $V_i(R)$ is chosen so that it renders high system capacity, e.g. the one corresponding to Proportional Fair or Maximum C/I policy with constant service priority weights. Then by further setting $\alpha_i$ and $\beta_i$ to appropriate non-zero values, it is possible to find an optimal balance between the level of compliance to QoS requirements and system capacity.

In the preferred embodiment, all $\alpha_i$ and all $\beta_i$ are equal to the same values:

$\alpha_i=\alpha_0$, for all $i=1, \ldots, M$, $\beta_i=\beta_0$, for all $i=1, \ldots, M$.

The values $\alpha_0$ and $\beta_0$ are chosen so that the corresponding scheduling method yields an acceptable error in compliance to the QoS requirements on the bandwidth sharing.

Controlling Impact of the Correction Term by a Different Filter

It is possible to choose different time scales the dynamic correction of the measured bandwidth shares and the primary scheduling strategy with constant service priority weights based on the utility function $V_i(R)$ are operating over by applying different filters to the transmitted rate $I_i(n)r_i(n)$ in the first and the second term of the expression (6). To this end, consider the scheduling policy that in time slot n schedules the users with the highest priority rank where ranks are given by $$\text{rank}_i = \qquad (7)$$
$$r_i(n)\left(\alpha_i V_i'(S_i(n)) - 2\beta_i \sum_{\substack{k=1\\k\neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $R_i(n)$ and $S_i(n)$ are filtered transmitted rate with possibly different filters applied to transmitted rate $I_i(n)r_i(n)$.

For example, $R_i(n)$ and $S_i(n)$ may be exponentially filtered transmitted rates with possibly different filter coefficients:

$R_i(n+1)=(1-\rho)R_i(n)+\rho I_i(n)r_i(n)$, $S_i(n+1)=(1-\tau)S_i(n)+\tau I_i(n)r_i(n)$, with $R_i(0)=R_{i0}$ and $S_i(0)=S_{i0}$.

Filter parameters $\rho$ and $\tau$ define the time scale the corresponding terms in formula (7) are operating over. Setting $0<\rho<\tau<1$ results in that correction term operates over a larger time scale. This yields a scheduling policy that behaves closely to the one corresponding to the user utility function $V_i(S)$ but has a dynamic correction for bandwidth shares which is applied on a larger time scale.

The opposite setting $0<\tau<\rho<1$ results in that the first term in formula (7) operates on a larger time scale. The resulting scheduling policy will try to keep QoS requirements on a shorter time scale but act as the one based on the user utility function $V_i(S)$ on a longer time scale.

Deploying different time scales to the two terms in the rank calculation gives a possibility to achieve different performance goals on two different time scales: the QoS requirements may be prioritized on one time scale while the total system capacity may be prioritized on the other time scale. This, in turn, allows an adaptation to the traffic pattern and to the QoS policy behavior desired by the operator.

Excluding Users with Poor Radio Conditions to Increase System Capacity

The proposed scheduling method tries to adapt the bandwidth share of each user depending on the transmitted rate of the other users. This means that the users with poor radio link quality that have low achievable data rates will reduce the bandwidth shares of other users and hence the whole system capacity.

To mitigate this effect, it is possible to exclude users with very poor radio link quality from influencing the correction term in formula (6) by setting the transmitted rate threshold $R_{imin}$ to some appropriate non-zero value. Excluding the users with poor radio link quality will increase the system capacity at expense of that those users will not get the required bandwidth shares. These users will, however, be considered for transmission together with other users and will not be starved unless their radio link quality is so bad that their achievable rate is equal to zero.

Performance Examples: Simulation Results

Performance for Varying Average Radio Link Quality

Figure 3:
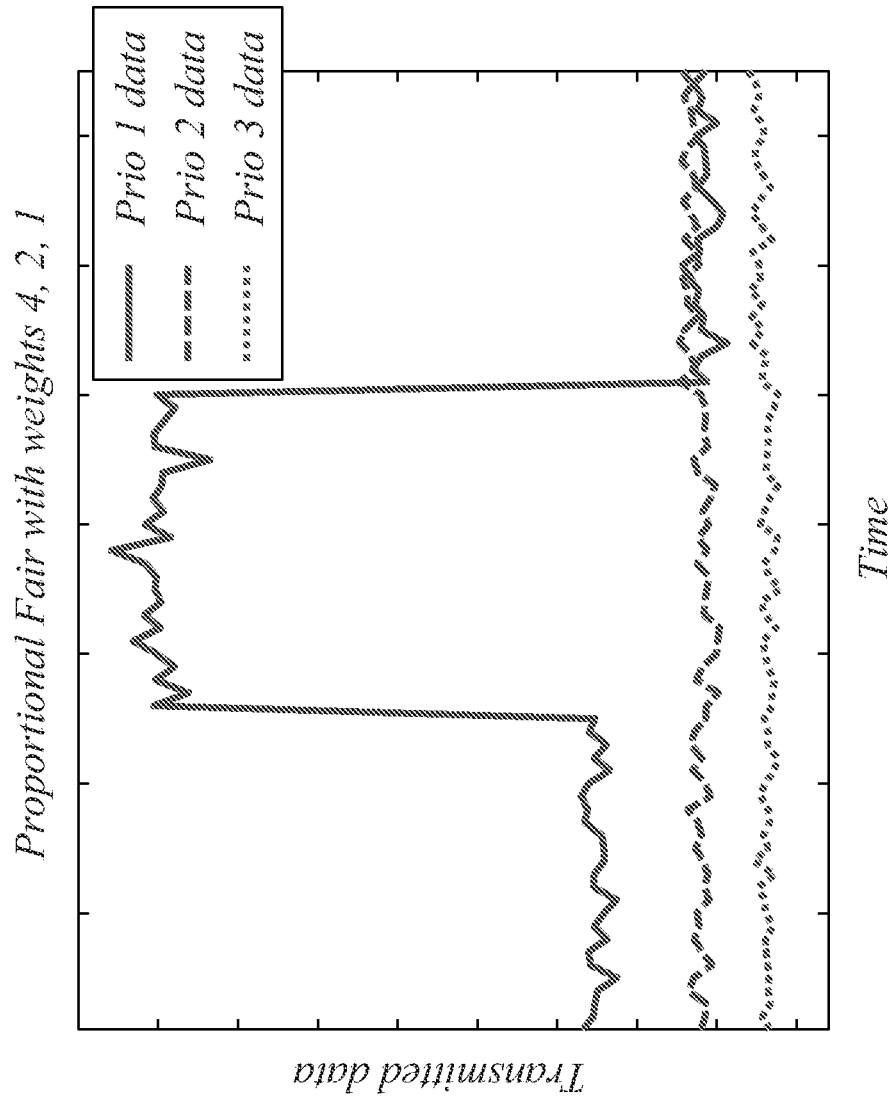
FIG. 3 is a schematic diagram illustrating a simulated example for Proportional Fair scheduling policy with constant service priority weights in case of three moving users with different priorities.
Figure 9:
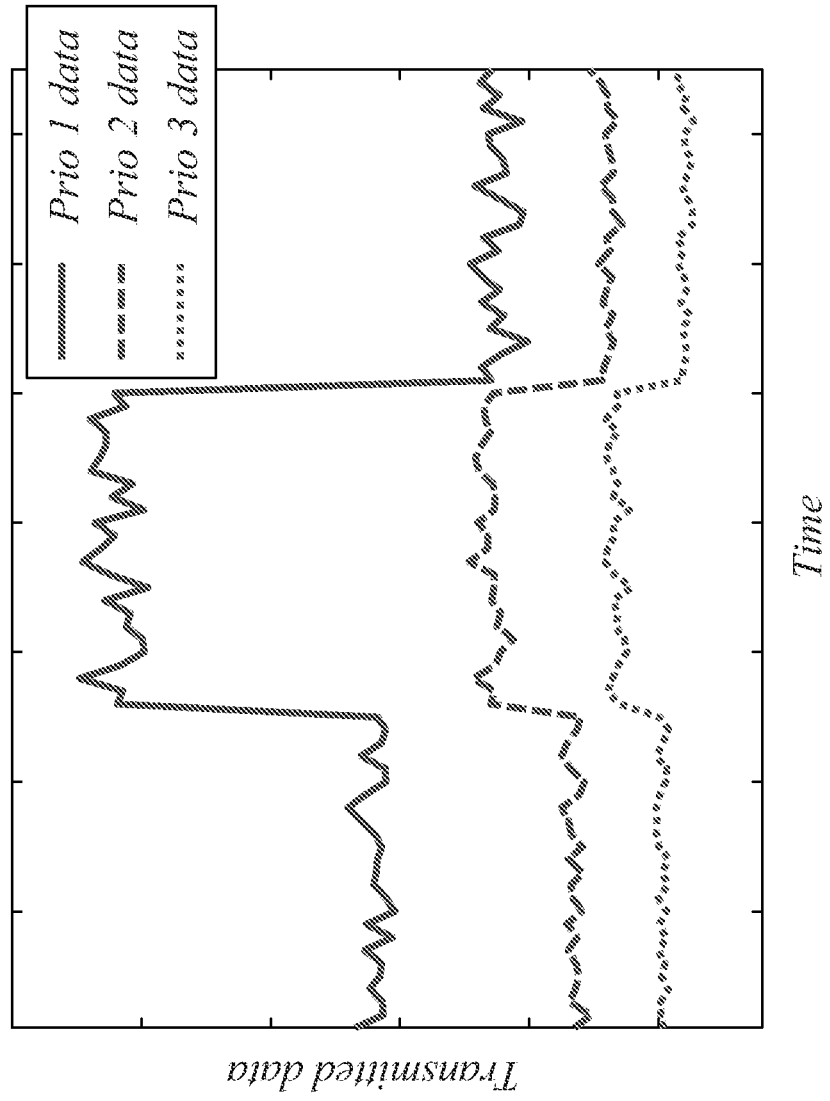
FIG. 9 is a schematic diagram illustrating a simulated example for 3 different priority users and adaptive QoS scheduling policy of the present technology.

FIG. 9 shows a computer simulation example for this scheduling strategy in the same situation as the one shown in FIG. 3. There are three users in the system receiving data from three different traffic priority classes with target bandwidth shares 4:2:1. In the beginning, all users have the same average radio link quality while after some time the user receiving priority class 1 data moves to a position where the average SIR experienced by that user becomes 10 dB lower than that of the other two users and then to a position where his/her average SIR becomes 10 dB higher than that of the other two users.

In the simulations, $\alpha_i=0$ and $\beta_i=1$ for all $i=1, \ldots, M$ so that the expression (6) contains only the second, correction, term which results in the scheduling algorithm with the highest possible compliance to the QoS requirements on the bandwidth shares. All the thresholds $R_{i min}$ are also set to zero.

FIG. 9 is a schematic diagram illustrating a simulated example for 3 different priority users and adaptive QoS scheduling policy of the present technology. It provides the required bandwidth shares even when priority 1 user moves to a position where average SIR gets 10 dB better and then to a position where average SIR gets 10 dB worse.

As may be seen in FIG. 9, the adaptive algorithm provides the required bandwidth shares in all three situations regardless of the average SIR which is in contrast to Proportional Fair strategy with constant service priority weights shown in FIG. 3.

Performance for Different Levels of Compliance to QoS Requirements

Figure 11:
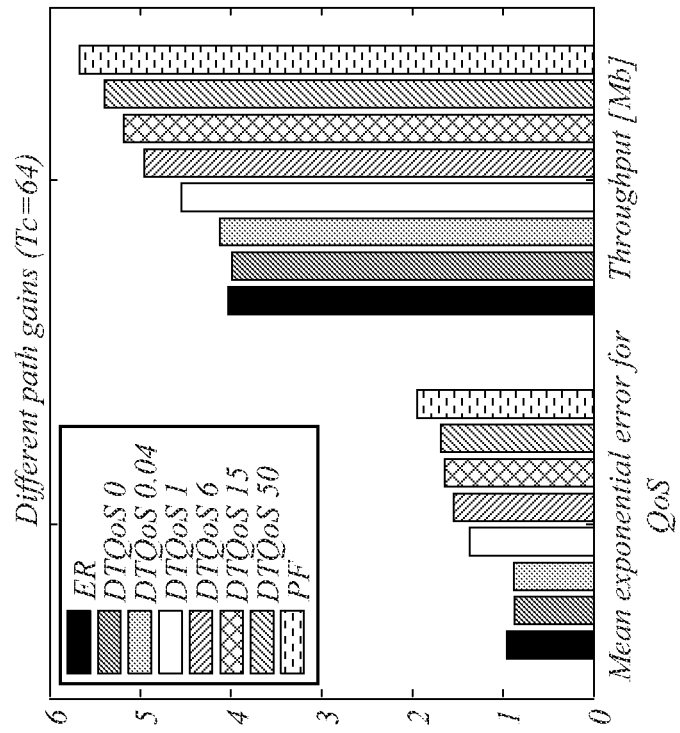
FIG. 11 is a schematic diagram illustrating an example of the mean error in bandwidth shares and HS-DSCH cell throughput in a simulated single-cell HSDPA system for different values of $\alpha_0$, where users have different average radio link quality.
Figure 10:
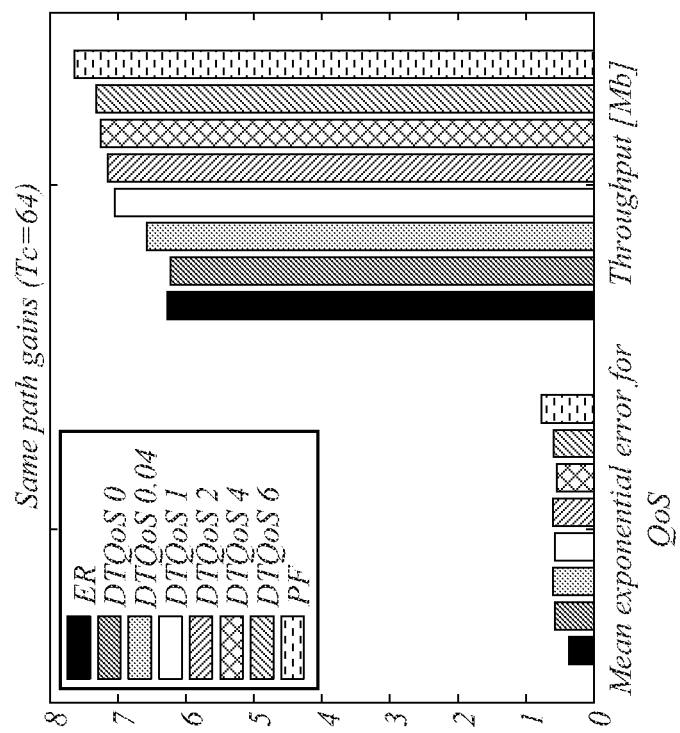
FIG. 10 is a schematic diagram illustrating an example of the mean error in bandwidth shares and HS-DSCH cell throughput in a simulated single-cell HSDPA system for different values of $\alpha_0$, where all users have the same average radio link quality.

FIGS. 10 and 11 illustrate the outputs from simulation results for a single-cell HSDPA system with the described adaptive scheduling policy for bandwidth sharing implemented. In these simulations, there are three users in the system receiving data from three different traffic priority classes with target bandwidth shares 4:2:1. In one scenario, all three users have the same average SIR on HS-DSCH. In another scenario, average SIR of the priority 1 user on HS-DSCH is 15 dB worse than that of the priority 3 user and average SIR of the priority 2 user is 5 dB worse than that of the priority 3 user.

FIG. 10 is a schematic diagram illustrating an example of the mean error in bandwidth shares and HS-DSCH cell throughput in a simulated single-cell HSDPA system for different values of $\alpha_0$. All users have the same average radio link quality.

FIG. 11 is a schematic diagram illustrating an example of the mean error in bandwidth shares and HS-DSCH cell throughput in a simulated single-cell HSDPA system for different values of $\alpha_0$. Users have different average radio link quality.

In the simulations, the primary utility function $V_i(R)$ is the one for Proportional Fair policy with constant service priority weights:

$$V_i(R) = W^{(m(i))} \log R,$$

with weights $(W^{(1)}=4, W^{(2)}=2, W^{(3)}=1)$; $\beta_i=1$ for all $i=1, \ldots, M$, while $\alpha_i=\alpha_0$ for $i=1, \ldots, M$ and increasing values of $\alpha_0$ are used starting with $\alpha_0=0$.

FIGS. 10 and 11 show the cell throughput and average error between the target bandwidth shares and received bandwidth shares defined by $$QoS \text{ Error} = \sum_{k=1}^{K} \sum_{m=1}^{K} \left(1 - \exp\left\{-\left(\frac{\overline{Q}^{(k)}}{\overline{Q}^{(m)}} - \frac{\omega^{(k)}}{\omega^{(m)}}\right)^2\right\}\right),$$

where $$\overline{Q}^{(k)}(n) = \frac{1}{M^{(k)}(n)} \sum_{i=1}^{M^{(k)}(n)} R_i(n).$$

The error is defined by an exponential mapping to avoid overflows in floating point arithmetics in cases where some classes are starved out. For such a class $\overline{Q}^{(k)}(n)$ will be almost equal to zero resulting in that the ratio $\overline{Q}^{(m)}/\overline{Q}^{(k)}$ will be extremely large. Those values will have largest input into the total error.

It may be seen that for values of $\alpha_0$ close to zero, i.e. with the correction term dominating in formula (6), in both scenarios performance of the adaptive algorithm is close to that of Equal Rate with constant priority weights. It has a bit smaller QoS error and a bit lower cell throughput for $\alpha_0=0$.

For increasing values of $\alpha_0$, the algorithm results in higher QoS error and higher cell throughput in both scenarios. The error and the total throughput increase up to the level of those in Proportional Fair policy with constant service priority weights so that it is possible to find an optimal value of $\alpha_0$ which yields the desired balance between the both characteristics.

The example of a scheduling method with user scheduling priority ranks given by formula (6):

provides a dynamic correction of the measured bandwidth shares to a strategy with constant service priority weights based on the utility function $V_i(R)$. Hence in contrast to a strategy based purely on the utility function $V_i(R)$, it achieves required bandwidth shares for different traffic priority classes over a given time period even in the environments where the average user radio link quality is changing. At the same time, it takes instantaneous radio link quality into account thus resulting in a higher overall system capacity than that achievable by a scheduling strategy with constant service priority weights based on the utility function $V_i(R)$.

allows to smoothly steer the level of compliance to the bandwidth share requirements by changing values of parameters $\alpha_i, \beta_i$ and find a desired balance between compliance to the QoS requirements and the total system capacity as shown in FIGS. 10-11.

works on a time scale defined by the filter constant $\rho$. This gives a possibility to adapt convergence time for the bandwidth shares to the dominating traffic type in the network which may be a bursty one, e.g. web-browsing.

The example of a scheduling strategy with user scheduling priority ranks given by formula (7) where different filters are deployed:

gives the possibility to choose different time scales for the dynamic correction of the measured bandwidth shares and the primary scheduling strategy with constant service priority weights based on the utility function $V_i(R)$. Hence, different performance goals may be achieved on two different time scales: the QoS requirements may be prioritized on one time scale while the total system capacity may be prioritized on the other time scale. This allows adaptation of the scheduling strategy to the dominating traffic types in the network and the desired QoS policy of the operator.

Figure 1:
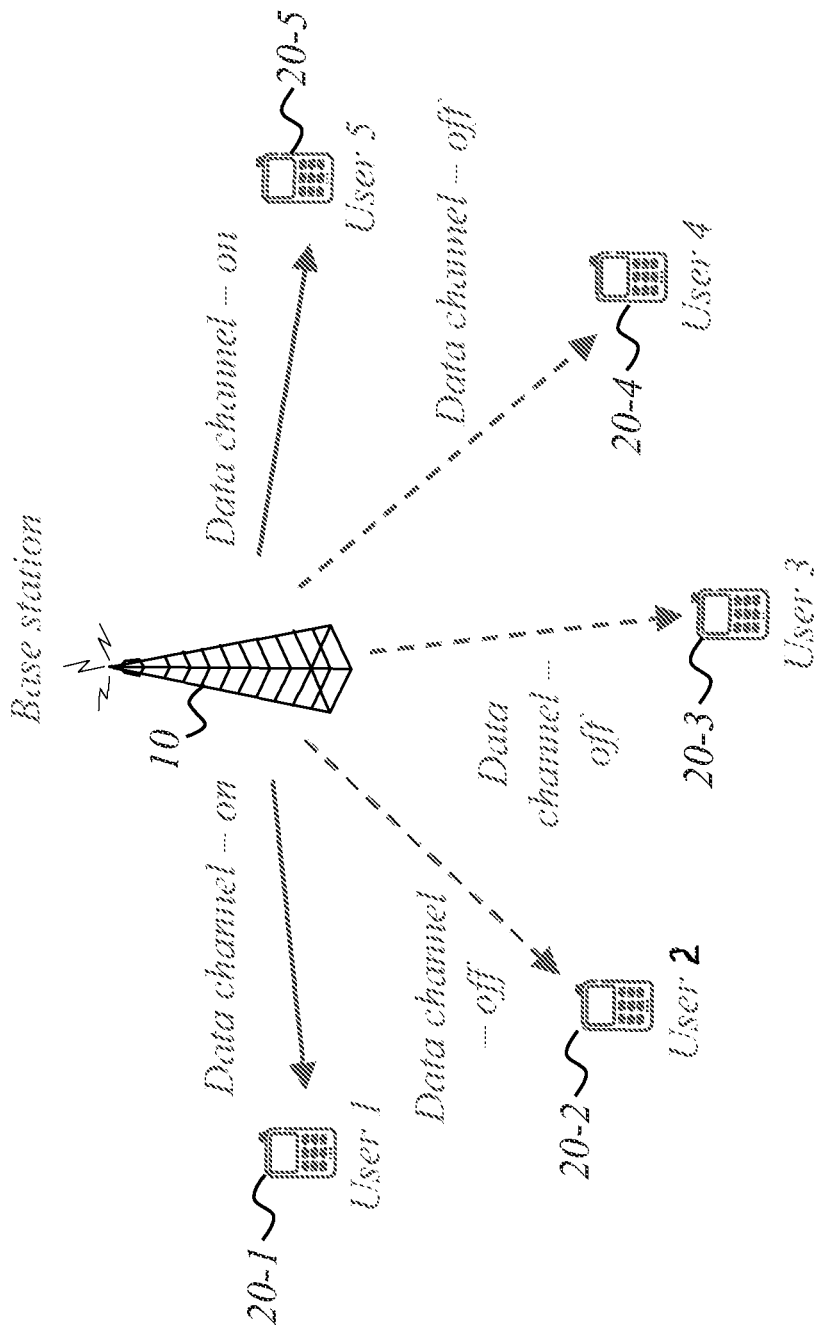
FIG. 1 is a schematic diagram illustrating scheduling of common transmission resources on a shared channel.
Figure 2:
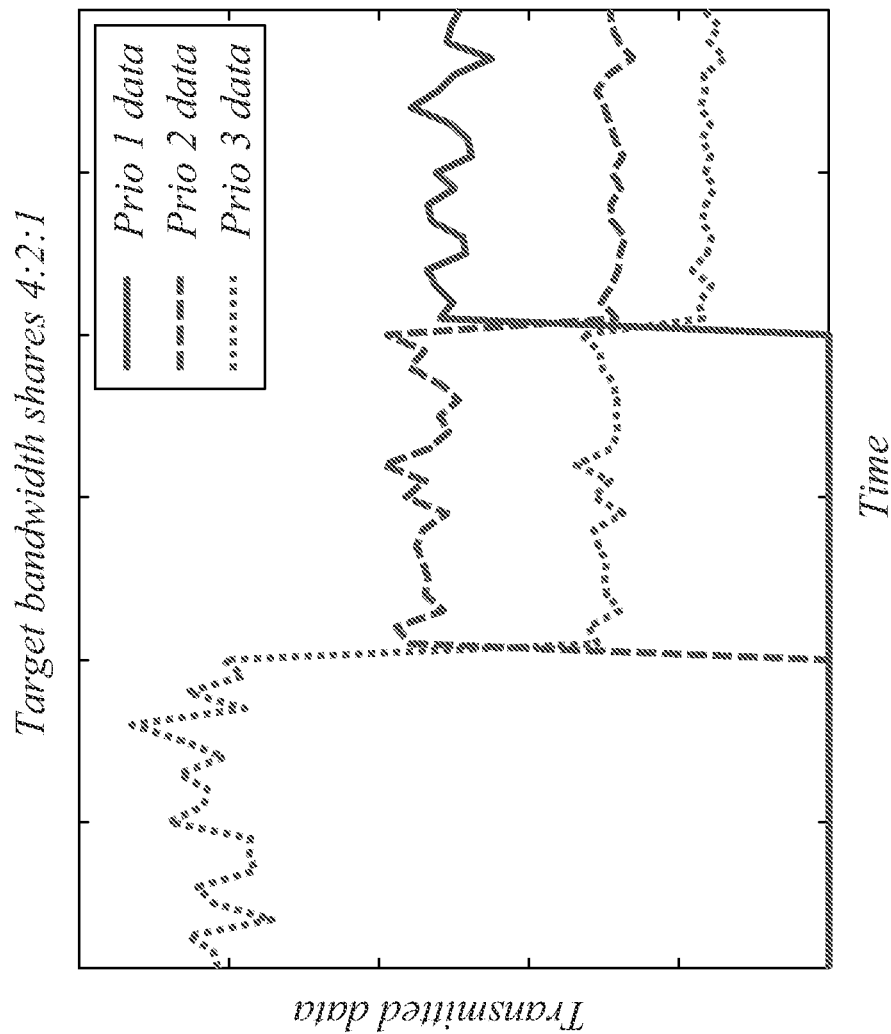
FIG. 2 is a schematic diagram illustrating an example of QoS bandwidth sharing between different traffic priority classes.

In a preferred illustrative embodiment, the described scheduling method is to be implemented in a base station such as the base station in the network setup shown in FIG. 1. The user scheduling decision may be performed at each transmission time slot before the data is directed to the data multiplexer and the base station transmitter.

It will be appreciated that the methods and devices described above can be combined and re-arranged in a variety of ways, and that the methods can be performed by one or more suitably programmed or configured digital signal processors and other known electronic circuits (e.g. discrete logic gates interconnected to perform a specialized function, or application-specific integrated circuits).

Many aspects of the present technology are described in terms of sequences of actions that can be performed by, for example, elements of a programmable computer system.

User equipment of the present technology includes, for example, mobile telephones, pagers, headsets, laptop computers and other mobile terminals, and the like.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device in which the present technology is implemented. It may also be possible to re-use existing software, e.g. by reprogramming of the existing software or by adding new software components.

Figure 12:
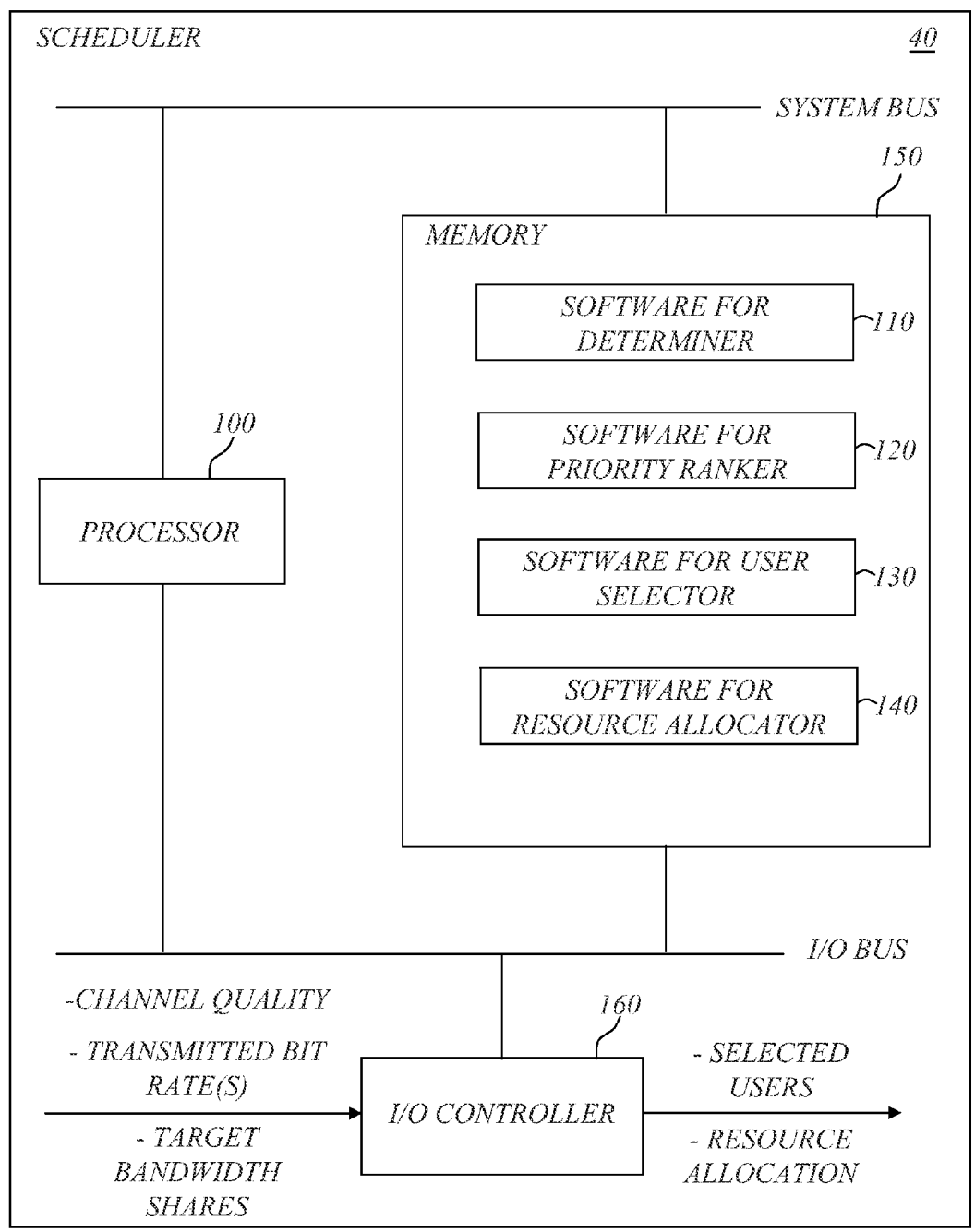
FIG. 12 is a schematic block diagram illustrating an example of a computer-implementation of a scheduler according to an embodiment.

In the following, an example of a computer-implementation of a scheduler will be described with reference to FIG. 12. This embodiment of the scheduler 40 is based on a processor 100 such as a micro processor or digital signal processor, a memory 150 and an input/output (I/O) controller 160. In this particular example, at least some of the steps, functions and/or blocks described above are implemented in software, which is loaded into memory 150 for execution by the processor 100. The processor 100 and the memory 150 are interconnected to each other via a system bus to enable normal software execution. The I/O controller 160 may be interconnected to the processor 100 and/or memory 150 via an I/O bus to enable input and/or output of relevant data such as input parameter(s) and/or resulting output parameter(s).

In this particular example, the memory 150 includes a number of software components 110-140. The software component 110 implements a determiner corresponding to block 42 in the embodiments described above. The software component 120 implements a priority ranker corresponding to block 44 in the embodiments described above. The software component 130 implements a user selector corresponding to block 46 in the embodiments described above. The software component 140 implements a resource allocator corresponding to block 48 in the embodiments described above.

The I/O controller 160 is typically configured to receive input data in the form of suitable representations of channel quality, transmitted bit rate(s) and/or target bandwidth shares and transfer the required input data to the processor 100 and/or memory 150 for use as input during execution of the software. Alternatively, the input data or at least parts thereof may already be available in digital form in the memory 150.

The resulting output data in the form of suitable representations of the selected users and/or resource allocation may be transferred as output via the I/O controller 160. If there is additional software that needs the resulting output data as input, this information can of course be retrieved directly from memory.

Moreover, the present technology can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

The embodiments described above are to be understood as a few illustrative examples of the present technology. It will be understood by those skilled in the art that various modifications, combinations and changes may be made to the embodiments without departing from the scope of the present technology. In particular, different part solutions in the different embodiments can be combined in other configurations, where technically possible. The scope of the present technology is, however, defined by the appended claims.

REFERENCES

[1] 3GPP TS 25.308. High Speed Downlink Packet Access (HSDPA). Overall description, Stage 2.
[2] S. Borst. User-level performance of channel-aware scheduling algorithms in wireless data networks. *EEE/ACM Transactions on Networking,* 13(3), 636-647, 2005.
[3] U.S. Pat. No. 6,449,490.
[4] E. Dahlman, S. Parkvall, J. Skold, P. Beming. 3G Evolution, HSPA and LTE for Mobile Broadband, $2^{nd}$ Edition. Academic Press, 2007. page 141, 110.
[5] J. Holtzman. Asymptotic analysis of proportional fair algorithm. *Proceedings of IEEE,* 2001.
[6] P. A. Hosein. QoS control for WCDMA high speed packet data. *Proceedings of the 4th IEEE Conference on Mobile and Wireless Communications Network,* Sep. 9-11, 2002, Stockholm, 69-173, 2002.
[7] H. J. Kushner and P. A. Whiting. Convergence of proportional-fair sharing algorithms under general conditions. *IEEE Trans. Wireless Commun.* 3, 1250-1259, 2004.
[8] US Patent Application Publication US 2010/0085923 A1.
[9] A. L. Stolyar. On the asymptotic optimality of the gradient scheduling algorithm for multiuser throughput allocation. *Oper. Res.,* vol. 53(1), 12-25, 2005.
[10] European Patent Application EP 1 469 641.
[11] US Patent Application Publication US 2006/0294044 A1.
[12] U.S. Pat. No. 7,761,875.
[13] L. Xu, X. Shen, J. W. Mark, Fair Resource Allocation with Guaranteed Statistical QoS for Multimedia Traffic in Wideband CDMA Cellular Network, *IEEE Transactions on Mobile Computing,* Vol. 4, No. 2, 2005.

The invention claimed is:

1. A method of ranking-based scheduling of multiple users on a shared communication channel of a serving base station in a wireless communication system, wherein said users are divided into a number of traffic classes, wherein each traffic class is associated with a predetermined target bandwidth share, and wherein the relation between the target bandwidth shares of different traffic classes are expressed as target bandwidth share ratios, said method comprising:

determining, for each user of a given traffic class, measured bandwidth share ratios with respect to an average rate of users of each of a number of other traffic classes;

determining, for each user, a priority rank based on an achievable bit rate of the user according to a reported channel quality and a quality of service component representing compliance of the measured bandwidth share ratios to the target bandwidth share ratios;

selecting a subset of said users among those users having the highest priority ranks; and allocating transmission resources of said base station to the selected subset of said users for transmission of user data on the shared communication channel.

2. The method according to claim 1, wherein said quality of service component includes a correction term for each deviation of the measured bandwidth share ratios from the target bandwidth share ratios.

3. The method according to claim 1, wherein said determining, for each user of a given traffic class, measured bandwidth share ratios comprises:

determining, for each user i of traffic class m(i), a filtered transmitted bit rate $R_i(n)$ over a number n of time slots;

determining an average filtered transmitted bit rate $\overline{R}^{(k)}(n)$ over users in traffic class k;

estimating, for each traffic class k except the traffic class m(i) of user i, the measured bandwidth share ratio as a ratio of the filtered transmitted bit rate and the average filtered transmitted bit rate expressed as:

$$\frac{R_i(n)}{\overline{R}^{(k)}(n)}.$$

4. The method according to claim 3, wherein $\overline{R}^{(k)}(n)$ is the average of filtered transmitted rate $R_i(n)$ over the users in traffic class k that have received a transmitted rate larger than some given non-zero threshold $R_{i\ min} \geq 0$.

5. The method according to claim 3, wherein the target bandwidth shares of the traffic classes are expressed as $\omega^{(1)}$, $\omega^{(2)}, \ldots, \omega^{(K)}$, assuming there are a number K of traffic classes, and $$\frac{\omega^{(m(i))}}{\omega^{(k)}}$$

is the target bandwidth share ratio of traffic class m(i) relative to traffic class k, wherein said correction term, for each user i of traffic class m(i), includes, for each traffic class k except the traffic class m(i) of user i, a difference defined as:

$$\frac{R_i(n)}{\overline{R}^{(k)}(n)} - \frac{\omega^{(m(i))}}{\omega^{(k)}}.$$

6. The method according to claim 5, wherein said determining, for each user, a priority rank is performed according to the following rank function:

$$\text{rank}_i = r_i(n)\left(\alpha_i V'_i(R_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V'_i(R_i(n))$ is the derivative of a basic utility function $V_i(R_i(n))$ for a radio link quality aware scheduling policy, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

7. The method according to claim 6, wherein the constants $\alpha_i$ and $\beta_i$ are non-zero.

8. The method according to claim 6, wherein the constants $\alpha_i$ are zero.

9. The method according to claim 5, wherein determining, for each user, a priority rank is performed according to the following rank function:

$$\text{rank}_i = r_i(n)\left(\alpha_i V'_i(S_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V'_i(S_i(n))$ is the derivative of a basic utility function $V_i(S_i(n))$ for a radio link quality aware scheduling policy, where $S_i(n)$ is a filtered transmitted rate estimated with a different filter operating at different time scale than the filter used for estimating the filtered transmitted rate $R_i(n)$, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

10. The method according to claim 9, wherein the constants $\alpha_i$ and $\beta_i$ are non-zero.

11. The method according to claim 9, wherein the constants $\alpha_i$ are zero.

12. The method according to claim 1, wherein the achievable bit rate $r_i(n)$ of user i is defined as the bit rate achievable according to the reported channel quality if the user is scheduled in time slot n.

13. The method according to claim 12, wherein the achievable bit rate $r_i(n)$ is the transport block size that the user is able to receive at time slot n according to the reported channel quality.

14. The method according to claim 1, wherein said ranking-based scheduling of transmission resources is performed for each of a number of time slots, and said allocating comprises granting, for each time slot, access to said shared communication channel to the selected subset of said users to effectuate dynamic bandwidth allocation.

15. A computer program product stored on a non-transitory computer readable medium and comprising computer program instructions that, when executed by a processor of a device, cause the device to perform a method for ranking-based scheduling of multiple users on a shared communication channel in a wireless communication system, wherein said users are divided into a number of traffic classes, wherein each traffic class is associated with a predetermined target bandwidth share, and wherein the relation between the target bandwidth shares of different traffic classes are expressed as target bandwidth share ratios, said computer program instructions causing the device to:
- determine, for each user of a given traffic class, measured bandwidth share ratios with respect to an average rate of users of each of a number of other traffic classes;
- determine, for each user, a priority rank based on an achievable bit rate of the user according to a reported channel quality and a quality of service component representing compliance of the measured bandwidth share ratios to the target bandwidth share ratios;
- select a subset of said users among those users having the highest priority ranks; and
- allocate transmission resources of said base station to the selected subset of said users for transmission of user data on the shared communication channel.

16. A scheduler for ranking-based scheduling of multiple users on a shared communication channel of a serving base station in a wireless communication system, wherein said users are divided into a number of traffic classes, wherein each traffic class is associated with a predetermined target bandwidth share, and wherein the relation between the target bandwidth shares of different traffic classes are expressed as target bandwidth share ratios, said scheduler comprising:
- a determiner configured to determine, for each user of a given traffic class, measured bandwidth share ratios with respect to an average rate of users of each of a number of other traffic classes;
- a priority ranker configured to determine, for each user, a priority rank based on an achievable bit rate of the user according to a reported channel quality and a quality of service component representing compliance of the measured bandwidth share ratios to corresponding target bandwidth share ratios;
- a user selector configured to select a subset of said users among those users having the highest priority ranks; and
- a resource allocator configured to allocate transmission resources of said base station to the selected subset of said users for transmission of user data on said shared communication channel.

17. The scheduler according to claim 16, wherein said priority ranker is configured to determine, for each user, a priority rank based on said achievable bit rate of the user according to the reported channel quality and a quality of service component that includes a correction term for each deviation of the measured bandwidth share ratios from the target bandwidth share ratios.

18. The scheduler according to claim 16, wherein said determiner is configured to:
- determine, for each user i of traffic class m(i), a filtered transmitted bit rate $R_i(n)$ over a number n of time slots;
- determine an average filtered transmitted bit rate $\overline{R}^{(k)}(n)$ over users in traffic class k; and
- estimate, for each traffic class k except the traffic class m(i) of user i, the measured bandwidth share ratio as a ratio of the filtered transmitted bit rate and the average filtered transmitted bit rate expressed as:

$$\frac{R_i(n)}{\overline{R}^{(k)}(n)}.$$

19. The scheduler according to claim 18, wherein said determiner is configured to determine said average filtered transmitted bit rate $\overline{R}^{(k)}(n)$ as an average of filtered transmitted rate $R_i(n)$ over the users in traffic class k that has received transmitted rate larger than some given non-zero threshold $R_{i\,min} \geq 0$.

20. The scheduler according to claim 18, wherein said priority ranker is configured to determine, for each user, a priority rank based at least partly on the achievable bit rate of the user and said quality of service component, which includes a correction term that, for each user i of traffic class m(i), includes, for each traffic class k except the traffic class m(i) of user i, a difference defined as:

$$\frac{R_i(n)}{\overline{R}^{(k)}(n)} - \frac{\omega^{(m(i))}}{\omega^{(k)}},$$

where $$\frac{\omega^{(m(i))}}{\omega^{(k)}}$$

is the target bandwidth share ratio of traffic class m(i) relative to traffic class k and the target bandwidth shares of the traffic classes are expressed as $\omega^{(1)}, \omega^{(2)}, \ldots, \omega^{(K)}$, assuming there are a number K of traffic classes.

21. The scheduler according to claim 20, wherein said priority ranker is configured to determine, for each user, a priority rank according to the following rank function:

$$\mathrm{rank}_i = r_i(n)\left(\alpha_i V_i'(R_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n)>0\}}\right),$$

where $r_i(n)$ denotes the achievable bit rate of user i in time slot n, $V_i'(R_i(n))$ is the derivative of a basic utility function $V_i(R_i(n))$ for a radio link quality aware scheduling policy, and $\alpha_i$ and $\beta_i$ are configurable constants, and $$1_{\{\overline{R}^{(k)}(n)>0\}}$$

is me indicator function:

$$1_{\{\overline{R}^{(k)}(n)>0\}}(\overline{R}^{(k)}(n)) = \begin{cases} 1, & \text{if } \overline{R}^{(k)}(n) > 0, \\ 0, & \text{if } \overline{R}^{(k)}(n) \leq 0. \end{cases}$$

22. The scheduler according to claim 21, wherein said priority ranker is configured to operate based on constants $\alpha_i$ and $\beta_i$ that are non-zero.

23. The scheduler according to claim 21, wherein said priority ranker is configured to operate based on constants $\alpha_i$ that are zero.

24. The scheduler according to claim 20, wherein said priority ranker is configured to determine, for each user, a priority rank according to the following rank function:

$$\text{rank}_i = r_i(n)\left(\alpha_i V'_i(S_i(n)) - 2\beta_i \sum_{\substack{k=1 \\ k \neq m(i)}}^{K} \frac{1}{\overline{R}^{(k)}(n)}\left(\frac{R_i(n)}{\overline{R}^{(k)}(n)} - \frac{\omega^{(m(i))}}{\omega^{(k)}}\right) \cdot 1_{\{\overline{R}^{(k)}(n) > 0\}}\right),$$

where $r_i(n)$ denotes the achievable bit rate of user i in time slot n, $V'_i(S_i(n))$ is the derivative of a basic utility function $V_i(S_i(n))$ for a radio link quality aware scheduling policy, where $S_i(n)$ is a filtered transmitted rate estimated with a different filter operating at different time scale than the filter used for estimating the filtered transmitted rate $R_i(n)$, and $\alpha_i$ and $\beta_i$ are configurable constants, and $$1_{\{\overline{R}^{(k)}(n)>0\}}$$

is the indicator function:

$$1_{\{\overline{R}^{(k)}(n)>0\}}\left(\overline{R}^{(k)}(n)\right) = \begin{cases} 1, & \text{if } \overline{R}^{(k)}(n) > 0, \\ 0, & \text{if } \overline{R}^{(k)}(n) \leq 0. \end{cases}$$

25. The scheduler according to claim 24, wherein said priority ranker is configured to operate based on constants $\alpha_i$ and $\beta_i$ that are non-zero.

26. The scheduler according to claim 24, wherein said priority ranker is configured to operate based on constants $\alpha_i$ that are zero.

27. The scheduler according to claim 16, wherein said scheduler is configured to perform said ranking-based scheduling of transmission resources on a time-slot basis to effectuate dynamic bandwidth allocation.

28. The scheduler according to claim 27, wherein said resource allocator is configured to grant, for each time slot, access to said shared communication channel to the selected subset of said users.

29. A base station comprising a scheduler for ranking-based scheduling of multiple users on a shared communication channel of a serving base station in a wireless communication system, wherein said users are divided into a number of traffic classes, wherein each traffic class is associated with a predetermined target bandwidth share, and wherein the relation between the target bandwidth shares of different traffic classes are expressed as target bandwidth share ratios, said scheduler comprising:

a determiner configured to determine, for each user of a given traffic class, measured bandwidth share ratios with respect to an average rate of users of each of a number of other traffic classes;

a priority ranker configured to determine, for each user, a priority rank based on an achievable bit rate of the user according to a reported channel quality and a quality of service component representing compliance of the measured bandwidth share ratios to corresponding target bandwidth share ratios;

a user selector configured to select a subset of said users among those users having the highest priority ranks; and a resource allocator configured to allocate transmission resources of said base station to the selected subset of said users for transmission of user data on said shared communication channel.

* * * * *